US010542006B2

(12) United States Patent
Chien

(10) Patent No.: US 10,542,006 B2
(45) Date of Patent: Jan. 21, 2020

(54) NETWORK SECURITY BASED ON REDIRECTION OF QUESTIONABLE NETWORK ACCESS

(71) Applicant: Daniel Chien, Bellevue, WA (US)

(72) Inventor: Daniel Chien, Bellevue, WA (US)

(*) Notice: Subject to any disclaimer, the term of this patent is extended or adjusted under 35 U.S.C. 154(b) by 168 days.

(21) Appl. No.: 15/465,315

(22) Filed: Mar. 21, 2017

(65) Prior Publication Data

US 2018/0145986 A1 May 24, 2018

Related U.S. Application Data

(63) Continuation-in-part of application No. 15/359,542, filed on Nov. 22, 2016, now Pat. No. 10,382,436.

(51) Int. Cl.
| | |
|---|---|
| *H04L 29/06* | (2006.01) |
| *H04L 29/08* | (2006.01) |
| *H04L 12/721* | (2013.01) |
| *H04L 12/741* | (2013.01) |
| *H04L 29/12* | (2006.01) |

(52) U.S. Cl.
CPC ............ *H04L 63/101* (2013.01); *H04L 45/72* (2013.01); *H04L 45/745* (2013.01); *H04L 63/0236* (2013.01); *H04L 63/107* (2013.01); *H04L 67/02* (2013.01); *H04L 67/22* (2013.01); *H04L 61/1511* (2013.01); *H04L 61/609* (2013.01)

(58) Field of Classification Search
CPC ..... H04L 63/101; H04L 63/107; H04L 67/02; H04L 67/22
USPC .......................................................... 726/4
See application file for complete search history.

(56) References Cited

U.S. PATENT DOCUMENTS

| | | | |
|---|---|---|---|
| 6,502,135 B1 | 12/2002 | Munger et al. | |
| 6,654,796 B1 | 11/2003 | Slater et al. | |
| 6,687,226 B1 | 2/2004 | Galyas | |
| 6,888,834 B1 | 5/2005 | Wood et al. | |
| 7,111,163 B1 | 9/2006 | Haney | |
| 7,143,175 B2 | 11/2006 | Adams et al. | |
| 7,346,770 B2 | 3/2008 | Swander et al. | |

(Continued)

FOREIGN PATENT DOCUMENTS

WO     2005/020446     3/2005

OTHER PUBLICATIONS

International Search Report and Written Opinion dated Apr. 23, 2008, which issued during the prosecution of International Patent Application No. PCT/US07/64102.

(Continued)

*Primary Examiner* — Malcolm Cribbs
*Assistant Examiner* — Angela R Holmes
(74) *Attorney, Agent, or Firm* — Benedict R. Dugan; Lowe Graham Jones PLLC

(57) ABSTRACT

Techniques for network security are disclosed. In some implementations, an evaluation module determines whether a network communication from a source computing system to a destination computing system is allowable. The allowability of the communication is determined based properties of the network communication, such as a source or destination address, a port number, a time of day, a geographic location, and the like. If the communication is disallowed, the evaluation module or a related component redirects the communication to an alternative computing system that masquerades as the destination communication system.

18 Claims, 9 Drawing Sheets

(56) References Cited

U.S. PATENT DOCUMENTS

| | | |
|---|---|---|
| 7,363,656 B2 | 4/2008 | Weber et al. |
| 7,457,823 B2 | 11/2008 | Shraim et al. |
| 7,461,404 B2 | 12/2008 | Duffield et al. |
| 7,536,723 B1 | 5/2009 | Bhagwat et al. |
| 7,725,936 B2 | 5/2010 | Banerjee et al. |
| 7,797,436 B2 | 9/2010 | Banerjee et al. |
| 7,826,602 B1 | 11/2010 | Hunyady et al. |
| 8,423,631 B1 | 4/2013 | Mower et al. |
| 8,495,700 B2 | 7/2013 | Shahbazi |
| 9,015,090 B2 | 4/2015 | Chien |
| 2002/0133721 A1 | 9/2002 | Adjaoute |
| 2003/0101357 A1 | 5/2003 | Ronen et al. |
| 2003/0118038 A1 | 6/2003 | Jalava et al. |
| 2003/0084349 A1 | 8/2003 | Friedrichs et al. |
| 2003/0149668 A1 | 8/2003 | Lee et al. |
| 2003/0149887 A1 | 8/2003 | Yadav |
| 2003/0149888 A1 | 8/2003 | Yadav |
| 2003/0185395 A1 | 10/2003 | Lee et al. |
| 2003/0188190 A1 | 10/2003 | Aaron et al. |
| 2003/0217289 A1 | 11/2003 | Ammon et al. |
| 2004/0003285 A1 | 1/2004 | Whelan et al. |
| 2004/0068562 A1 | 4/2004 | Tilton et al. |
| 2004/0088537 A1 | 5/2004 | Swander et al. |
| 2004/0123141 A1 | 6/2004 | Yadav |
| 2004/0123157 A1 | 6/2004 | Alagna et al. |
| 2004/0162992 A1 | 8/2004 | Sami et al. |
| 2004/0186850 A1 | 9/2004 | Chowdhury et al. |
| 2004/0187034 A1 | 9/2004 | Tamura et al. |
| 2004/0255151 A1* | 12/2004 | Mei ................ H04L 63/105 726/25 |
| 2005/0047355 A1 | 3/2005 | Wood et al. |
| 2005/0060412 A1 | 3/2005 | Chebolu et al. |
| 2005/0076222 A1 | 4/2005 | Olkin et al. |
| 2005/0172229 A1 | 8/2005 | Reno et al. |
| 2005/0228899 A1 | 10/2005 | Wendkos et al. |
| 2006/0021031 A1 | 1/2006 | Leahy et al. |
| 2006/0031412 A1 | 2/2006 | Adams et al. |
| 2006/0059092 A1 | 3/2006 | Burshan et al. |
| 2006/0059136 A1 | 3/2006 | Wooldridge et al. |
| 2006/0059238 A1 | 3/2006 | Slater et al. |
| 2006/0059337 A1 | 3/2006 | Poyhonen et al. |
| 2006/0069697 A1 | 3/2006 | Shraim et al. |
| 2006/0069782 A1* | 3/2006 | Manning ............... H04L 29/06 709/227 |
| 2006/0123464 A1 | 6/2006 | Goodman et al. |
| 2006/0123478 A1 | 6/2006 | Rehfuss et al. |
| 2006/0168022 A1 | 7/2006 | Levin et al. |
| 2006/0190993 A1 | 8/2006 | Noble |
| 2006/0203807 A1 | 9/2006 | Kouretas et al. |
| 2006/0212931 A1 | 9/2006 | Shull et al. |
| 2006/0224742 A1 | 10/2006 | Shahbazi |
| 2006/0230039 A1 | 10/2006 | Shull et al. |
| 2006/0230272 A1 | 10/2006 | Lawrence et al. |
| 2006/0253903 A1 | 11/2006 | Krumel |
| 2007/0006305 A1 | 1/2007 | Florencio et al. |
| 2007/0083670 A1 | 4/2007 | Kelley et al. |
| 2007/0268837 A1 | 11/2007 | Melton et al. |
| 2008/0077995 A1 | 3/2008 | Curnyn |
| 2008/0147837 A1 | 6/2008 | Klein et al. |
| 2008/0172382 A1 | 7/2008 | Prettejohn |
| 2009/0043765 A1* | 2/2009 | Pugh ................... H04L 63/1441 |
| 2009/0185523 A1 | 7/2009 | Allen et al. |
| 2009/0271625 A1 | 10/2009 | Kolluru et al. |
| 2009/0287844 A1 | 11/2009 | Bailey |
| 2010/0325424 A1* | 12/2010 | Etchegoyen ........ H04L 63/0853 713/155 |
| 2011/0113249 A1 | 5/2011 | Gelbard et al. |
| 2013/0198065 A1 | 8/2013 | McPherson et al. |
| 2013/0252604 A1 | 9/2013 | Huber et al. |
| 2014/0258465 A1 | 9/2014 | Li |
| 2015/0213131 A1 | 7/2015 | Styler et al. |
| 2015/0229609 A1 | 8/2015 | Chien |

OTHER PUBLICATIONS

International Search Report and Written Opinion dated Aug. 21, 2014, which issued during the prosecution of International Patent Application No. PCT/US14/31244.

Supplementary European Search Report completed Jul. 11, 2016, in European Patent Application No. 14836161, 7 pages.

* cited by examiner

NETWORK SECURITY BASED ON REDIRECTION OF QUESTIONABLE NETWORK ACCESS

CROSS-REFERENCE TO RELATED APPLICATIONS

This application is a continuation-in-part of U.S. application Ser. No. 15/359,542, titled "Network Security Based on Device Identifiers and Network Addresses," filed Nov. 22, 2016, the entire contents of which are incorporated herein by reference.

TECHNICAL FIELD

The invention disclosed herein is directed to network security and more specifically to identifying and prohibiting a questionable network communication with a destination computing system by redirecting the communication to an alternative computing system that simulates the operation of the destination system.

BACKGROUND

Today, through networks such as the Internet, there are intruders, hackers, unauthorized users, and programmed devices trying to breaking into other computers, servers, firewalls, routers, PDAs, cell phones, game consoles, and other electronic devices that connected to the network. For example, website servers, other devices, and users may send a virus, a worm, adware, spyware, or other files to another electronic device on the network. The files may cause the other device to run some malware (e.g., backdoors, worms, Trojans, etc.) that may initiate a network connection to other equipment, such as a web server, to spread a virus, to get another virus to send confidential information to others, and/or other undesirable actions. It is desirable to detect and prevent these actions from happening.

Hackers and other malicious parties are increasingly attempting to penetrate corporate and government networks. In many cases, these parties are attempting to steal information, damage equipment, install malicious software, or otherwise gain advantages over the network owner or operator. These attacks are typically network-based. In some cases, the attacker attempts to gain remote access to a target network via security holes in publicly accessible computers (e.g., Web servers, mail servers). In other cases, the attacker attempts to gain local, physical access to the target network, such as by visiting a corporate site and connecting their computing device to the target network.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
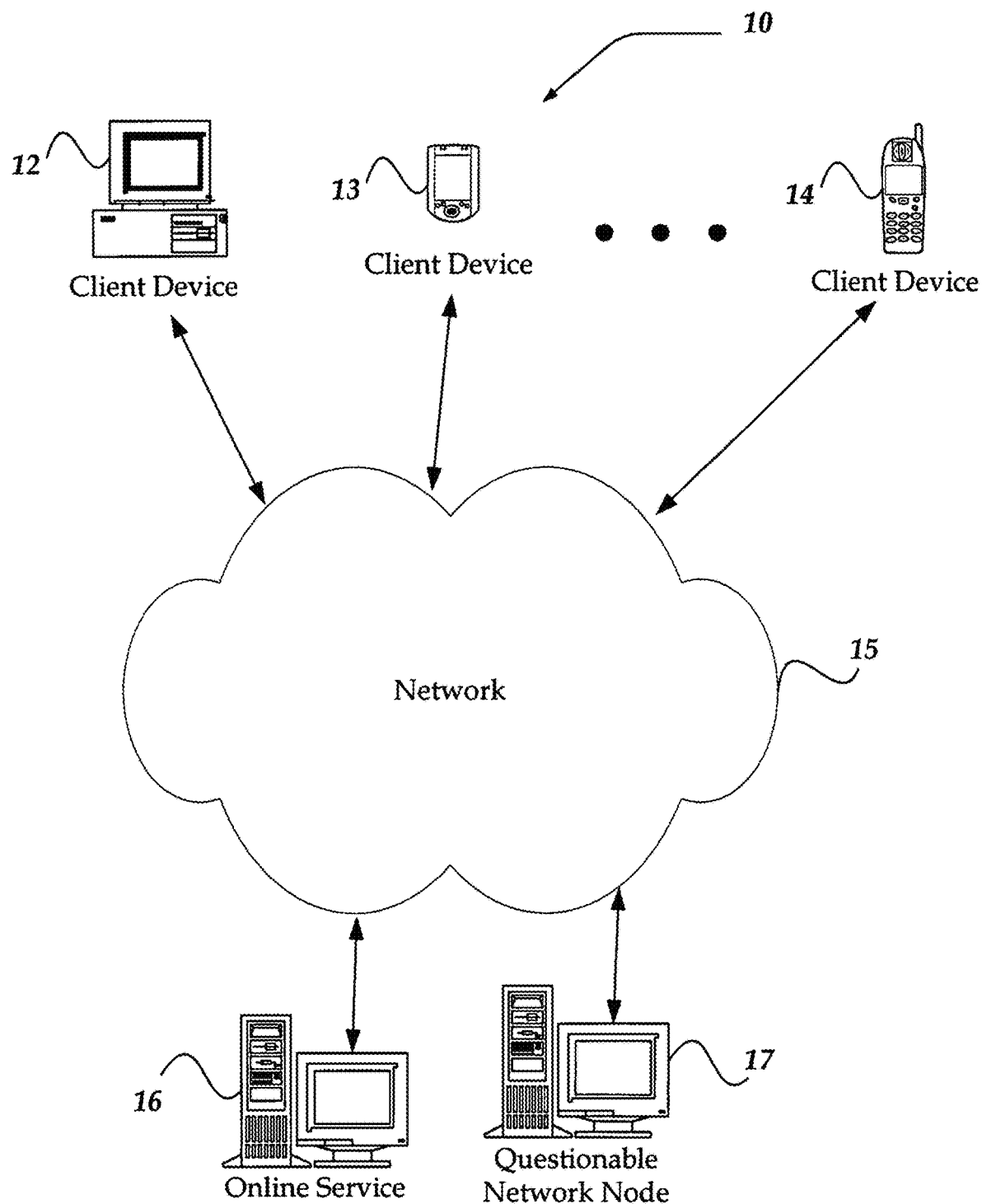
FIG. 1 shows a functional block diagram illustrating one embodiment of an environment for practicing the invention.

Embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as an end processor of data or services, and the term "server" refers to a computing module's role as a provider of data or services to one or more clients. In general, it is possible that a computing module can act as a client, requesting data or services in one transaction and act as a server, providing data or services in another transaction, thus changing its role from client to server or vice versa.

The term "web" generally refers to a collection of devices, data, and/or other resources that are accessible over a network according to one or more protocols, formats, syntax, and/or other conventions that are intended for use with computing devices, such as personal computers, laptop computers, workstations, servers, mini computers, mainframes, cellular phones, personal digital assistants (PDAs), and the like. Web protocols include, but are not limited to, the hypertext transfer protocol (HTTP). Such conventions include, but are not limited to, hypertext markup language (HTML) and extensible markup language (XML). The terms "web page" and "web data" generally refer to a document, file, application, service, and/or other data that conforms to web conventions and is generally accessible with a computing device running an application such as a general purpose browser. Example general purpose browsers include Internet Explorer™ from Microsoft Corporation, Netscape™ from Netscape Communications Corp., and Firefox™ from the Mozilla Foundation. Web pages are generally indexed by search engines that are able to access web pages. An example search engine is Google™ by Google, Inc.

The term "URL" generally refers to a uniform resource locator, but may also include a uniform resource identifier and/or other address information. A URL generally identifies a protocol, such as hypertext transfer protocol (e.g., "http://"), a host name (e.g., "news.google.com") or a domain name (e.g., "google.com"), a path (e.g., "/intl/en/options"), and a specific file (e.g., "pack installer.html") or a query string (e.g., "?hl=en"). The term "URI" generally refers to a string of characters used to identify a name or a web resource. Combined with URL, this can represent web resource over a network.

Briefly, embodiments of the invention evaluate network communications and redirect those communications that are determined to be questionable to a mock computing system. Evaluating a communication includes comparing properties of the communication to allowable networking properties that are typically represented in a white list or other data structure. Allowable networking properties may specify source/destination IP addresses, ports, times of day, geographic locations, and the like.

In some embodiments, determining whether a communication is allowable includes evaluating a TCP/IP connection. The connection can be evaluated during its establishment (while handshaking) or after it is established. Some embodiments require that both source and destination IP address (and possibly port) are checked against authentic IP addresses and ports stored in a white list or other structure. Authentic IP addresses are obtained from the Internet Assigned Numbers Authority (IANA) or a similar entity that is responsible for managing the allocation of network addresses. The evaluation technique takes advantage of the fact that the source and destination addresses cannot be "faked" when establishing or engaging in a TCP/IP session. For example, if a source node uses a false source address, then the destination node will not be able to properly address a return (e.g., SYN-ACK) packet. Of course, in the context of other protocols, it may be possible to use a false source address. For example, a UDP packet may be modified to include a false source address, in which case the source node would not be able to receive a reply.

If a communication is determined to be questionable in nature, such as because its source IP address is not in the list of allowable network properties, then the communication is redirected to an alternative computing system. The alternative computing system is a "mock system," which masquerades as the actual destination computing system by copying at least some of the function, appearance, structure, and data of the actual destination system. The mock system will often include data that is fake, false, or otherwise inauthentic. In some cases the fake data is specially configured to track its use. For example, the fake data may include a fictional customer lists that includes names, addresses, or numbers with unique spellings or errors that can be used to identify the source of the data. Digital image data may include watermarks or other signals that may be similarly used to track the data.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, an online service 16, and a questionable network node 17 that is not directly associated with the online service. Network 15 is in communication with and enables communication between each of client devices 12-14, online service 16, and questionable network node 17. Online service 16 may comprise one or more servers for a legitimate website, an email service, a file storage service, a domain name assignment service, a network address identification service, and the like. Questionable network node 17 may comprise a dishonest user's client device, a source of computer viruses, one or more servers for a website posing as another website, a valid network node that has been compromised by a malicious user (e.g., hacker, disgruntled employee), or another network node used for illegitimate or misleading purposes. Each network node has a network address, such as an IP address that is unique to each network node. The network address generally also includes a port number to identify a specific communication session, a particular resource within a network node, or other refinement to the network address to enable proper communication between nodes. The true network address is needed for communication to or from a network node. Address masking, domain name translation, and other schemes may disguise a network address at various points along a communication path. However, the true network address is derived at some point, or the communication will not occur between the intended nodes.

Client devices 12-14 may include virtually any computing device capable of receiving and sending a message over a network, such as network 15, to and from another computing device, such as online service 16, each other, and the like. The set of such devices may include devices that are usually considered more general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Network 15 is configured to couple one computing device to another computing device to enable them to communicate. Network 15 is enabled to employ any form of medium for communicating information from one electronic device to another. Also, network 15 may include a wired interface, such as an Internet interface, and/or a wireless interface, such as a cellular network interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, online service 16, and/or questionable network node 17. Network 15 is constructed for use with various communication protocols including transmission control protocol/Internet protocol (TCP/IP), user datagram protocol (UDP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically stores and/or carries computer-readable instructions, data structures, program modules, or other data that can be provided to a processor. Computer-readable media may include transmission media for transmitting a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of an electronic device is described in more detail below in conjunction with FIG. 2. For discussion purposes, a general purpose client computing device is described as an example. However, a server device, a special purpose device (e.g., cell phone, router, firewall), and/or other electronic device may be used in embodiments of the invention. In this example, a client device 20 may include any computing device capable of connecting to network 15 to enable a user to communicate with other network resources, such as other client devices, online service 16, and/or questionable network node 17. Client device 20 may include many more components than those shown. The components shown, however, are sufficient to disclose an illustrative embodiment for practicing the invention. Many of the components of client device 20 may also be duplicated in a server of online service 16, a server of questionable network node 17, and/or other electronic devices. Some embodiments implement at least some of the described functions in the context of a router, firewall, or other network devices. Such network devices will include many of the components of the client device 20 described below.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging and/or other applications. A messaging client module 36 may include computer executable instructions, which may be run under control of operating system 31 to enable email, instant messaging, SMS, and/or other messaging services. Similarly, a server device configured much like client device 20 (and/or client device 20 itself) may include a messaging server module 37, which provides routing, access control, and/or other server-side messaging services. Client device 20 may further include an evaluation module 38, which generally evaluates communications for valid senders, requests, and/or other data. Evaluation module 38 may be implemented separate from other applications, may be implemented as a plug-in to another application (such as a browser), may be implemented directly within another applications (such as an email application), may be implemented as a server application, and/or other forms.

Figure 2:
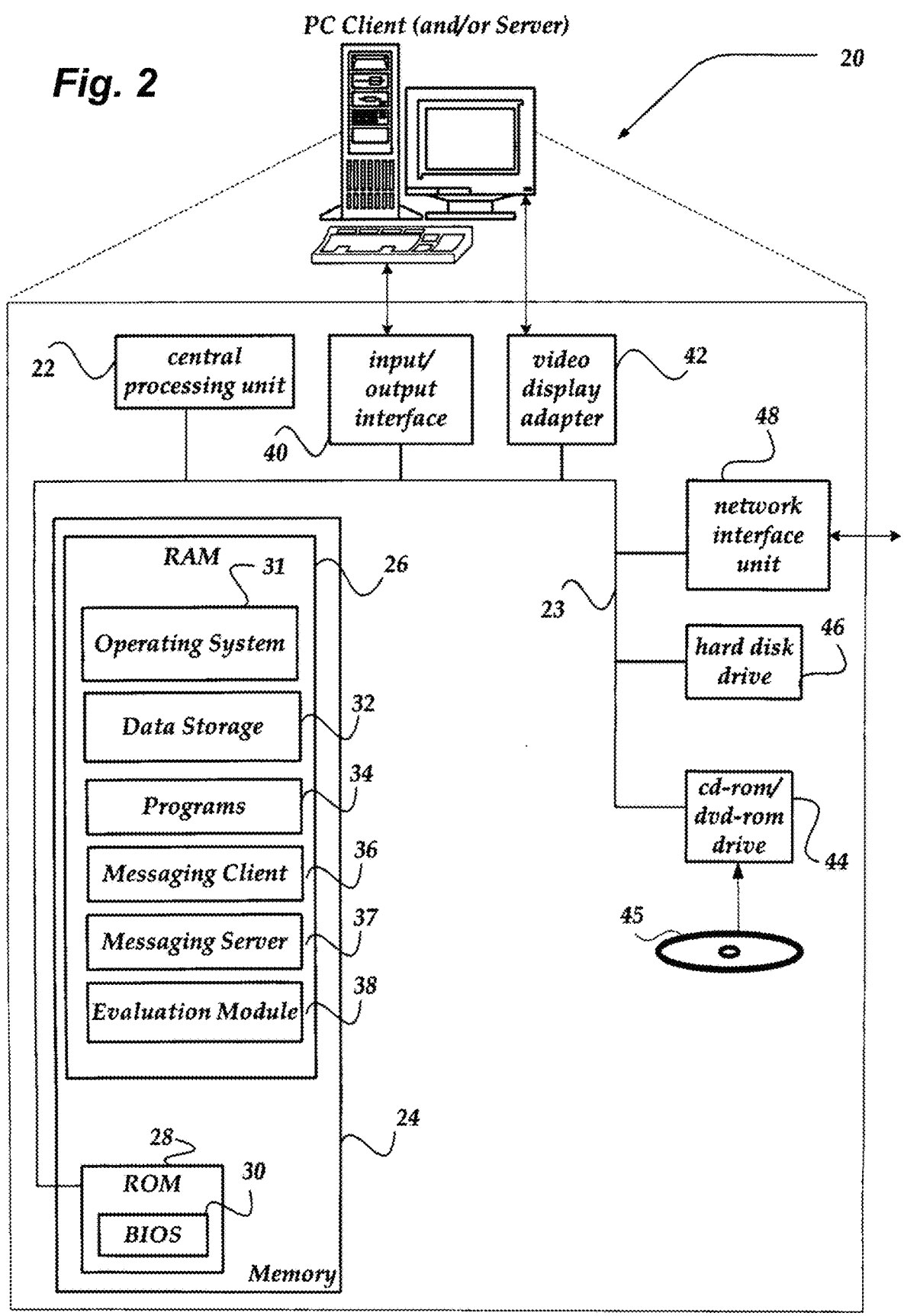
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or blocks 34-38. Interaction with the user interface includes visual interaction via a display, and a video display adapter 42.

For some client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 45, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 48, client device 20 can communicate with a wide area network such as the Internet, a local area network, a wired telephone network, a cellular telephone network, or some other communications network, such as network 15 in FIG. 1. Network communication interface unit 48 is sometimes known as a transceiver, transceiving device, network interface card (NIC), and the like.

In an IP network, such as the Internet, a connection or session between two nodes is generally made using IP addresses and TCP/UDP port numbers. Either node is aware of its own and the other node's IP address and port number. In order to establish two-way communication, both the source and destination addresses/ports in transmitted packets must be correct and legitimate (not false). The port is generally an endpoint to a network node. The port number typically represents a specific communication session, a specific function, a specific resource, or other identity within this network node. Port numbers are generally divided into three ranges: Well Known Ports, Registered Ports, and Dynamic and/or Private Ports. The Well Known Ports are generally assigned by an assignment service, such as IANA. Registered Ports may be optionally registered for desired purposes. Dynamic or Private Ports are generally used by a network node for frequently changing communications and/or for private purposes. To receive communication, a program on a destination node places a network port into a listening state. When a packet is received from the network, the TCP/IP stack (or similar module for UDP) on the destination node associates (e.g., queues) the packet with the listening port so that it can be consumed by the listening program.

For an outbound connection request to another node, a client uses the other node's IP address and port number. For an inbound connection, such as to a client, the requester will identify its IP address and port number. If an intermediary node is used, such as an Internet service provider server, the intermediary node will generally know each node's IP address and port number. For example, a server will generally know the IP address and local port number of both a requesting node and a client node, so that the intermediary server can relay communications between the requesting node and the client node.

Similarly, for downloading a file that is initiated by a server or a client, the IP addresses and port numbers are known. For instance, if the download is from a website or other network service, the IP address and port number of a network node that provides the file can be determined from a public or local assignment database, as discussed above. In some circumstances, the IP address and port number may be those of a valid, trustworthy network node. However, a malicious user (e.g., hacker, disgruntled employee) may access the trustworthy node and attempt to distribute a virus or other undesirable file. In this case, an embodiment of the invention evaluates the payload of the communication. In one embodiment, an evaluation module evaluates the payload of a packet to determine and check payload data against a category identifier that indicates allowable data. In another embodiment, the evaluation module evaluates an overall file extension, file author, creation date, and/or other properties of a file to be transferred, to determine whether the file should be blocked and/or a warning issued. For example, it may be acceptable to download a news document from a trusted network node, but not download executable code. One or more category codes can be associated with the IP address and port number of each trustworthy node to indicate those types of payload data, download files, or other data that are allowed.

The IP address, port number, and other identifiable information are stored in a file, database, and/or other data source that identifies network nodes and files that are valid and/or otherwise trusted. Such a data source is sometimes referred to herein as a white list. A white list is generally distinct from a black list that specifically identifies addresses, nodes, data sources, or other information that is to be blocked or otherwise not trusted. For example, a white list used for certain embodiments of the invention does not include IP addresses for any unauthenticated network nodes or any anonymous proxy servers.

The white list may be a subset of an IANA WHOIS database. The white list may identify network nodes of only legitimate financial institutions, reputable websites, reputable download websites, reputable antivirus company websites, and/or other service providers. Such service providers may include an ISP. Thus, the white list may be modified during installation or otherwise, to include IP addresses and other information associated with one or more Internet service providers. Service providers may need to access client equipment, other Internet nodes that a client node may need to access, or some other network node that has permission to access a certain device for a specific function. In addition, a white list may include an address owner's name, domain name, category code, and other information.

In some embodiments, the addresses, ports, and other contents of the white list are provided by IANA or some other entity that can provide authentic, legitimate IP addresses. Some embodiments use a secure, authenticated communication mechanism (e.g., TLS) in order to communicate with IANA (or similar entity) to obtain the IP addresses for the white list. The provided IP addresses may be digitally signed by the source entity (e.g., IANA) so that they can be checked for tampering and authenticity.

The white list may also include at least some internal IP addresses. For example, where the network evaluation is performed at the edge of a private network, the white list may contain external IP addresses that identify trusted external nodes in addition to internal addresses (e.g., unrouteable addresses in the range those in the range 192.168.0.0/16).

A white list may be stored at a client, at a server that provides a file, at an intermediary node in the communication, or at a neutral node that is not directly part of the communication between two end nodes. Multiple white lists may be used at a single, or multiple nodes, to accommodate masked network addresses, proxy servers, and the like. For example, multiple white lists may be distributed to various routers or other nodes to perform intermediary checks as a message, web page, or other communication moves along a communication path.

Embodiments of the invention can be implemented to provide multiple tiers of security. A top tier is the IP address. A second tier is the port number. A third tier is the category or other property (e.g., payload type, time of day, geographic location). Other tiers may be associated with other aspects of the communication. Depending on application requirements, an embodiment may apply various levels of evaluation. One embodiment may only perform a first tier evaluation by checking a white list for a trusted IP address. For higher security, an embodiment may check all tiers. An administrator may set a level of evaluation in an evaluation module.

Other information in the white list may include a security rating, which is used to indicate whether user interaction is needed. For example, for a highest security rating, an evaluation module will automatically perform its evaluation and make all decisions. For another security rating, a user interaction may be needed to allow a communication, a file download, or other action associated with a questionable network node. For a lowest rating, the evaluation module may automatically block communication, file download, or other access. In addition, or alternatively, the security rating may be confirmed or separately determined while checking a communication. For example, if the IP address, port number, and category code matches those in the white list, the evaluation module may indicate a high security rating. If the IP address and port number match, but the category code does not match, the evaluation module may determine an intermediate security rating, and request a user instruction on how to proceed. If the IP address and port number do not match those in the white list, the evaluation module may determine a lowest security rating. The evaluation module and/or other applications can take different actions, depending on the security rating.

Multiple scenarios exist in which an evaluation module may identify a high risk network node. Although not limited to the following, some examples include:

1. For an outbound connection request, like visiting a website, an FTP (File Transfer Protocol) site, or other network node, the destination node's IP address and port number are checked. If the destination node's IP address and port number are not in the white list, or otherwise considered a high risk, the evaluation module can prevent the connection, give a warning, require a user approval, require additional authentication of the destination node, or perform another predefined action. If the user were to approve the connection, the destination node's IP address, port number, and/or other information would be added to the white list.

2. For an inbound connection request, the requesting node's IP address and local device port number are checked against the white list. This can stop an intruder, a hacker or other unauthorized user from gaining access to the receiving device and/or a computer network. The receiving device (or an intermediary node) can refuse the connection, drop packets, give a warning, require a user approval, require additional authentication of the requesting node, redirect the communication to a mock computing system, or perform another action. If the user were to approve the connection, the requesters node's IP address, port number, and/or other information would be added to the white list.

3. For file transfer, the source node can be checked before a file is downloaded. Conversely, a destination node can be checked before a file is sent to a questionable node. As discussed above, the IP address, port number, and file type can be checked against the white list. Similar to the connection scenarios, the evaluation module can prevent the file transfer, require a user approval, require additional authentication of the requesting node, or perform another predefined action. If the user were to approve the file transfer, the questionable node's IP address, port number, and/or other information would be added to the white list. The file extension would also be stored as a category along with the corresponding IP address, port number, and/or other information.

White lists and other data structures used to specify security policies, rules, or properties may be organized in various ways. In some cases, the white list can be represented as a key-value data structure, in which keys are associated with values. The keys are typically IP addresses or address ranges, but could also or instead be network interface numbers, user identifiers, program names, process identifiers, geographic locations, or the like. The values are typically policies, rules, or properties that are used to express a limitation or permission to perform a network communication.

Figure 3:
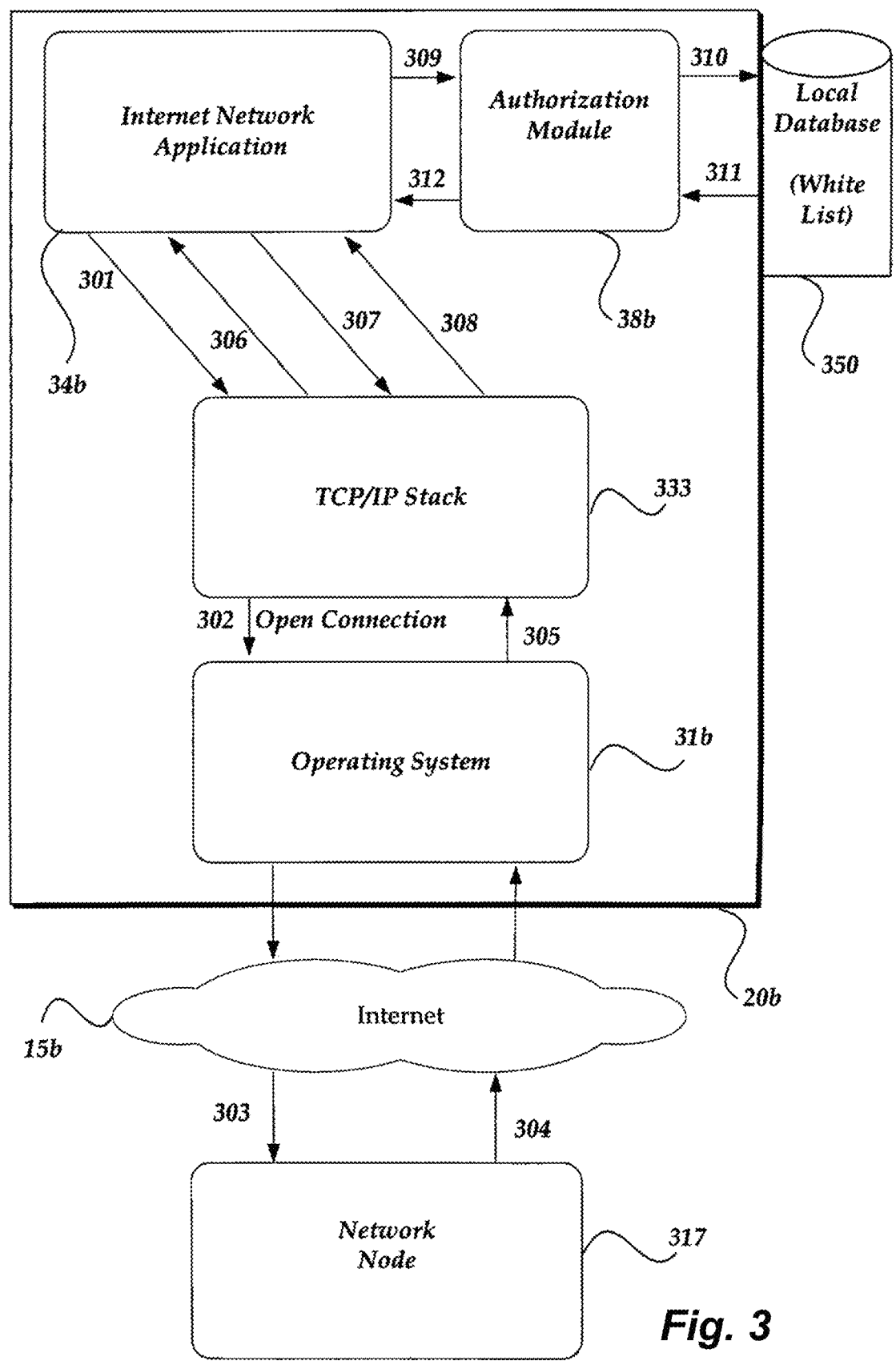
FIG. 3 illustrates an architecture and communication sequence for one embodiment of the present invention.

FIG. 3 illustrates an architecture, communication sequence, and method for one embodiment of the present invention. Not all of the illustrated modules may be required to practice the invention, or additional modules may be included for other embodiments. In various embodiments, some modules may be combined, while other modules may be divided into multiple modules. Example scenarios are discussed relative to the following architecture.

In this example embodiment, the architecture includes a computing device 20*b* that communicates through a public Internet 15*b* with a network node 317. Device 20*b* includes an operating system 31*b* in communication with Internet 15*b* and in communication with a TCP/IP stack 333. TCP/IP stack 333 is in communication with an Internet network application 34*b*. In some embodiments, the device 20*b* may also include other communications components/modules, such as a UDP/IP stack configured to send and receive UDP packets.

The network application 34*b* may generally be any communicating program, whether client, server, or otherwise. To receive inbound communication, the application 34*b* may open a port in a listening state. Although the network application 34*b* is shown executing on the device 20*b*, in other embodiments it may instead execute on some other network node. For example, if the device 20*b* is a router, gateway, firewall, or other networking device, the device 20*b* may be responsible for evaluating packets or other communications transmitted from the network node 317 to some program and/or system executing on an internal network.

The authorization module 310 is in communication with a local database 350, which may be included in device 20*b* or in communication with device 20*b*. Local database 350 generally comprises a white list storing an association between IP addresses, TCP/IP port number, category, security rating, domain names, their owners and/or other data.

Example Scenario 1

Inbound Connection

Network node 317 may request a connection to (or otherwise communicate with) device 20b, at a communication step 304. Client operation system 31b receives this communication, which typically involves the receipt of a network packet that includes the IP address and port number of network node 317. The communication generally also includes the port number of network application 34b, to identify network application 34b as the resource that the network node desires to contact. In the scenario of an inbound connection, the application 34b opens the port in a listening state. The request may further include a file name or other information on the data that the network node desires. The operating system passes this information to TCP/IP stack 333 at a communication step 305. The TCP/IP stack passes this information to internet network application 34b at a communication step 306.

Network application 34b then passes the IP address, port number, and other information to authorization module 38b, at a communication step 309. The authorization module may determine a category code for any information that was requested by network node 317. The authorization module uses this information to check database 350. The authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to authorization module 38b, at a communication step 311. authorization module 38b may pass the information directly to network application 34b. Based on whether the IP address and port number are in the white list, the authorization module can send an instruction at step 312 to close the connection, reject information that was received, send out a warning message, waiting for a user decision, redirect the communication to a mock computing system, and/or other action.

Example Scenario 2

Outbound Connection

In this example embodiment, a user of device 20b may initiate an Internet connection, such as to a website. Internet network application 34b detects a user request for connection, at a communication step 301. The request is first sent to TCP/IP stack 333 to resolve domain name or URL into an IP address. Resolving domain name may require accessing a DNS. However, the IP address from a DNS may be masked or otherwise misleading. TCP/IP stack 333 sends the request through to operating system 31b at a communication step 302, and the operating system makes a TCP connection through the Internet to the network node 317, at a communication step 303.

Network node 317 (e.g., a website's corresponding server) returns the request at a communication step 304. Also returned is the accurate IP address and port number of the network node 317. Client operating system 31b receives the IP address and port number, and passes this information to TCP/IP stack 333 at a communication step 305. The TCP/IP stack passes control to the application 34b at a communication step 306. The application program may determine a category code of any file or other data received from network node 317. At a communication step 307, the application requests the IP address and port number from the TCP/IP stack. For example, the network application may invoke a GetIPAddressByName object or a GetHostByName object. The TCP/IP stack returns the IP address and port number to the application, at a communication step 308.

Network application 34b then passes the IP address, port number, category code and other information to authorization module 38b, at a communication step 309. The authorization module uses this information to check database 350. The authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to authorization module 38b, at a communication step 311. Authorization module 38b may pass the information directly to network application 34b. Based on whether the IP address and port number are in the white list, the authorization module 38b can send an instruction at step 312 to close the connection, reject information that was received, send out a warning message, wait for a user decision, and/or other predefined action.

In some embodiments, the authorization module 38b or some other component performs one or more checks before any outbound connection can be initiated. For example, the authorization module 38b may determine whether the application 34b is allowed to initiate an outbound connection or even be allowed to execute in the first place. This determination may be made based on one or more factors, such as program identity (e.g., name, hash of executable), time of day, program type (e.g., interactive, non-interactive), destination address/port, or the like.

White Lists

In some embodiments, white lists have one or more of the following features in addition to well-known organization IP addresses. A core advantage of the described white lists is that IP addresses used in a two-way communication (e.g., as part of a TCP/IP session or UDP communication) are difficult or impossible to forge. While it is possible for an attacker or other party to spoof a source IP address in a packet, such spoofing generally cannot be used in the TCP/IP context, where two-way communication is necessary to establish a session. Thus, by utilizing IP addresses obtained from the network stack, the described techniques can identify questionable network communications with a high degree of confidence.

In addition, white lists provide advantages over black lists in that once a questionable IP address is added to a black list, the unauthorized users of that IP address can just move their attack to a different computing system that operates with a different IP address. In a world where criminal organizations operate entire networks of compromised machines, it is trivial for those organizations to shift their unauthorized activities (e.g., sending spam) from one machine to another.

The described techniques may also function at multiple distinct levels within a given computing system. For example, the described techniques may utilize information received or obtained from the operating system kernel, the network stack, and the application. For example, the authorization module 38*b* may utilize information received from the application level (e.g., an email header field received from an email client, where the email header includes the true source IP address of the email message), the network level (e.g., an IP address received from the TCP/IP stack), and the operating system (e.g., a permission setting received from the operating system kernel).

Also, the described techniques provide an infrastructure or framework for implementing security at different levels of the computing system. For example, a white list or similar structure may contain information or properties that are used to implement security or authorization facilities in the operating system kernel, the network stack, and one or more applications.

A white list may also allow communication with respect to specified geographic locations, possibly in conjunction with certain IP addresses. Geographic locations may be determined based on the regional Internet registry that has allocated a particular IP address. As discussed above, IP addresses are allocated by regional Internet registries, such as IANA, ARIN, APNIC, LACNIC, AfriNIC, RIPE NCC, and the like. Given an IP address, is possible to determine which regional Internet registry allocated the IP address, and thereby determine a region (e.g., a continent or country) associated with the IP address. The regional registry may further support queries that will provide the country or more detailed geographic information, such as a country, state, or city associated with an IP address. Other sources of geographic information include the whois database and commercial or public geo-location services that are configured to provide fine-grained geographic information, including country, state, city, latitude/longitude, postal code, area code, and the like.

Geographic information may be used to limit access to users in a specified region. For example, a government may limit access to IP addresses that are located in the country or jurisdiction of that government. As another example, IP addresses for specific regions may be flagged as dangerous, such as based on the high level of computer crime operating from those regions. As another example, an e-commerce computing system (e.g., a banking system, an online shopping system) may only allow customer accesses from IP addresses that are associated with the same geographic region (e.g., city, state, country) in which the customer resides. For example, if a particular customer resides in Seattle, a particular e-commerce system may only allow accesses to the customer's account from IP addresses that are allocated to Washington state or to the United States. Also, for high security organizations such as the government or military, the organization may only allow certain geographic locations to have access and block other locations (e.g., China).

White lists may take different forms in different embodiments. White lists may exist on the public Internet and/or on private internal networks. A white list can be created for a private internal network in a manner similar to that employed over the public Internet. For example, a bank may have a white list that associates a customer Internet IP address with a specific bank account. On the consumer side, the bank account holder may have a white list that includes the internal IP address of the bank's computing system. Also, multiple lists may exist on a single device. For example, one white list for inbound traffic and one for outbound data. In addition, each Network Interface Card (NIC) may have its own white lists. In addition, white lists can be generated statically (e.g., predefined) or dynamically. For example, for websites, a dynamic list may be generated based on the incoming IP address information. Later accesses can then be compared based on the list, so that questionable communications can be indicated, such as when a Website URL resolves to an IP address that is different from one stored in the list.

Example white lists may contain one or more of the following fields or properties described below in Table 1. Each of the fields indicates one or more allowable communication properties, such as the allowed direction of communication (e.g., upload or download, send or receive), the allowed time period for communication (e.g., between 8 AM and 11 PM), the allowed program/process (e.g., Internet Explorer), and the like. In other embodiments, the table may also or instead include indications of disallowed communication properties, such as a time period during which communication is disallowed (e.g., between midnight and 4 AM), disallowed communication ports (e.g., port 80 commonly used for HTTP), or the like.

TABLE 1

| Field/Property | Description/Function |
|---|---|
| IP address and/or Mask | Identify allowable IP addresses or IP address ranges. For internal networks, the IP addresses may be internal (private) IP addresses. A mask may be used to specify a range of IP addresses. IP addresses may be obtained from IANA or another source of authentic addresses. |
| Device identifier | Identify allowable non-modifiable device identifiers, such as one or more identifiers of a CPU, motherboard, storage device, network device, or the like. |
| Port numbers | Identify allowable port numbers or ranges, thereby implying allowable functions such as FTP, Telnet, HTTP, and the like. In some embodiments, an allowable port (or range) may also be associated with one or more programs that are allowed to communicate via the allowable port. |
| Block state | Allow or disallow access from the corresponding address |
| Category code/ data type | Indicate the allowable type of data from the communication, such as executable code, scripts, macros, audio, video, image, text files, or the like. |
| Direction | Define allowable direction for communication, such as upload, download, incoming, outgoing. A highly secure device may, for example, disallow any inbound connections. |
| Security rating | Specify a security level associated with this IP address, such as highly secure, secure, general, not secure, high risk, or the like. |
| Sub-organization code | Specify a subset of IP address within an organization. For example, for an organization, it may divide their IP addresses into subgroups, like one group for Web, the other group for Telnet. |

TABLE 1-continued

| Field/Property | Description/Function |
| --- | --- |
| URL/URI | Organization official URL associated with the IP addresses. Sometimes, HTTP redirect may redirect to very similar URL that, for example, hosts a phishing website to fool people. As another example, an HTTP link in an email may look similar to a legitimate URL. URLs appearing in communications may be compared against the organizational URL to determine whether the communication is questionable. Furthermore, checking the URI may provide additional protection. |
| Domain name | Can be used to match the domain name. Email address has the domain name that can be checked. |
| Geographic location information | Country code, city, street address, zip code, etc. This can be used to restrict access to certain geographic locations. Properties of this table can be associated with particular geographic locations, in addition to or instead of IP addresses or other identifiers (e.g., host names, domain names). |
| Network Interface | This is for multiple network interface (NIC) device. This field identifies a network interface (e.g., "eth0"). Properties of this table need not be associated with IP addresses or ranges, but can instead (or in addition) be associated with particular network interfaces. |
| Process name or signature | Specify which programs can access the network or communicate with a given IP address and/or port. This will prevent virus program to access network sending, receiving data, or spread itself to others. Programs may be identified by name, location, or signature/hash (e.g., MD5, SHA1, etc.). |
| Interactive/ Batch Mode | Many malicious programs will run in batch or non-interactive mode. This can prevent virus program accessing email account to send or receive data. The mode can be determined in various ways, such as checking whether there is an active console, UI window, interactive input device (e.g., mouse), or the like. |
| Access time | Specify a time or period during which network access is allowed. This will inhibit malicious code that runs during odd (e.g., late night) hours. |
| Number of connections | Limit how many inbound or outbound connections can be made to or from the network. This can be used to prevent denial-of-service attacks. |
| Access control | Specify what kinds of operations can be performed with respect to a corresponding IP address and/or port, including read, write, modify, execute, and the like. These access rights may be operating system specific or application specific. Certain applications may provide access rights that are distinct from those in the underlying system. For example, in a messaging application, sending an outgoing message may require an access right that is distinct from reading an incoming message. |
| User/group identifier | An identifier (e.g., user name, account number, user number) of a user or group of users that is allowed to use the corresponding IP address. For authentication purpose, it can verify user identification, password and IP address and/or port number. |
| Inbound/ outbound | Inbound traffic may have different security requirements than that of outbound traffic. Each may have separate white list. |
| Address validity | Require that the source address and/or port associated with any outbound network traffic is valid. |

The above fields may be combined in various ways. For example, with reference to FIG. 1, when a client 12, 13, or 14 initiates an outbound connection, it may check one or more of the process name, access time window, batch/interactive processing, destination IP address and/or port, URL/URI or domain name if appropriate, security rating, upload/download, category code, or payload type. In some embodiments, if any one of these items does not match the corresponding entries/fields in the white list the connection may be disallowed. In other embodiments, the user may be notified, such as by presenting a popup window/dialog, sending a message (e.g., an email) that describes the questionable communication, or the like.

As another example, when a client 12, 13, or 14 receives an inbound connection, it may check one or more of the IP address and port number of remote device, the program (process name) that is serving this connection (e.g., listening on the port), access time window, batch or interactive process, URL/URI or domain name if appropriate, security rating, upload/download, category code, or payload type.

The white list may also include entries that identify generally secure systems or services, such as well-known corporations that have good security practices. For these systems (e.g., identified by IP address or domain name) it may be safe to allow access, download, or upload of any type of data.

If the device has already been infected by malicious code such as a virus, the described techniques can prevent the virus from accessing the network to upload important information by checking the program name (e.g., process name), the access time window, payload type, batch or interactive mode. This may prevent the virus from spreading to another device. If the virus is trying to open another program like web browser that is already on the allowable process list to access an online email account to send out data, the access time window and batch mode checking can still stop it by, for example, disallowing all batch mode web browser programs.

In some embodiments, the white list may be accessed by an IP address that is determined based on the payload of a network packet. The network communication may be transported (e.g., transmitted, received) by way of multiple network packets that each have a header and a payload section. The header section typically contains the control data necessary for the network to route or otherwise process the packet, such as source and destination address, error detection codes (e.g., checksums), sequence information (e.g., sequence number), and the like. The payload section includes user data. In a layered network protocol, the payload section may include control information for a higher layer of the network stack. For example, the payload of an IP datagram may encapsulate a TCP packet/segment, which itself may have a header section and payload section. Furthermore, the payload of the example TCP packet/segment may include control information and data from a higher-level (e.g., application level) protocol, such as HTTP.

The process may obtain contents from the payload section of a packet, and then determine the IP address based on those contents. In some cases, the contents may include an IP address of the sender that can be used directly. In another example, the contents may include a domain name of a sender that can be translated into an IP address, such as via a reverse DNS lookup.

One embodiment is configured to evaluate HTTP requests by determining an IP address based on the contents of one of the fields in the HTTP request header. The HTTP header may include fields such as X-Forwarded-For, which identifies the IP address of a client connecting to a Web server through an HTTP proxy or other intermediary translation system. The X-Forwarded-For IP address is an example of an IP address that is determined based on the payload of a network packet. Note that this IP address is typically different than the source IP address of the HTTP connection, since in a proxy scenario the source IP address of the HTTP connection is that of the proxy server.

As another example, some embodiments are configured to evaluate SIP ("Session Initiation Protocol") requests in the telephony and voice-over-IP (VOIP) context. For example, a SIP INVITE request includes FROM and CONTACT fields that include IP addresses or hostnames. When a hostname is included, that hostname can be translated to an IP address by way of a reverse DNS lookup. Also, geo-location may be used in the SIP context in order to determine the geographic location of the caller. In some embodiments, if the geographic location does not match the geographic location/region of the source telephone number (or if it is from a disallowed region), then the connection may be disallowed.

As another example, some embodiments are configured to evaluate email transmissions. In this context, an IP address can be determined by inspecting the email header and reading an address from one of the relevant fields, such as the RECEIVED, FROM, SENDER, or RETURN-PATH fields. The RECEIVED field is added by each server or agent in a chain of transmissions, and therefore accurately represents the true identity of the computing system that transmitted the message.

As a further example, some embodiments are configured to evaluate virtual private networking ("VPN") communications by extracting an encapsulated IP address. VPN protocols typically encapsulate packets transmitted by an endpoint system or process via the virtual network interface. Such packets may be encapsulated according to various standards, such as PPTP, IPsec, L2TP, and the like. Some embodiments may access and possibly decrypt the encapsulated packet to obtain or otherwise determine the source IP address of the packet. That IP address may then be used to access the whitelist.

Some of the described techniques can be used to address the issue of denial of service ("DOS") attacks. For example, some embodiments are specified to limit the number of inbound or outbound connections that can be made. Such a maximum can be specified globally (e.g., overall total number of connections shall not exceed a specified maximum), per-address or per-address block (e.g., maximum number of connections to a specific IP address or address range), per-host or per-domain (e.g., maximum number of connections to a specific hostname or domain name), per-geographic location (e.g., maximum number of connections to a specific country), or the like. By limiting the maximum number of connections, embodiments are able to prevent, limit, or reduce the impact of DOS attacks, many of which rely on networks of compromised computers to direct network traffic against a target host.

Some embodiments provide a "listening port lockdown" processes. In such a process, the use of listening ports is restricted in order to limit the impact of DOS attacks and/or to generally limit or malicious network communications. An example of a listening port lockdown process is presented with respect to FIG. 5, below.

To further address the issue of DOS attacks, some embodiments check the source address associated with any outbound network traffic. Because some DOS attacks forge the source address of outbound packets, some embodiments ensure that the source address of each packet is the same as the IP address assigned to a given computer, or is at least within a specified range (e.g., within a specified subnet). For example, in DOS attacks directed at a DNS server, attackers forge the source address of the UDP packet used to transmit the DNS request to the server. In such cases, the server (or an intermediate node such as a router or firewall) may check the source address of DNS request packets in order to filter out illegitimate requests.

Figure 4:
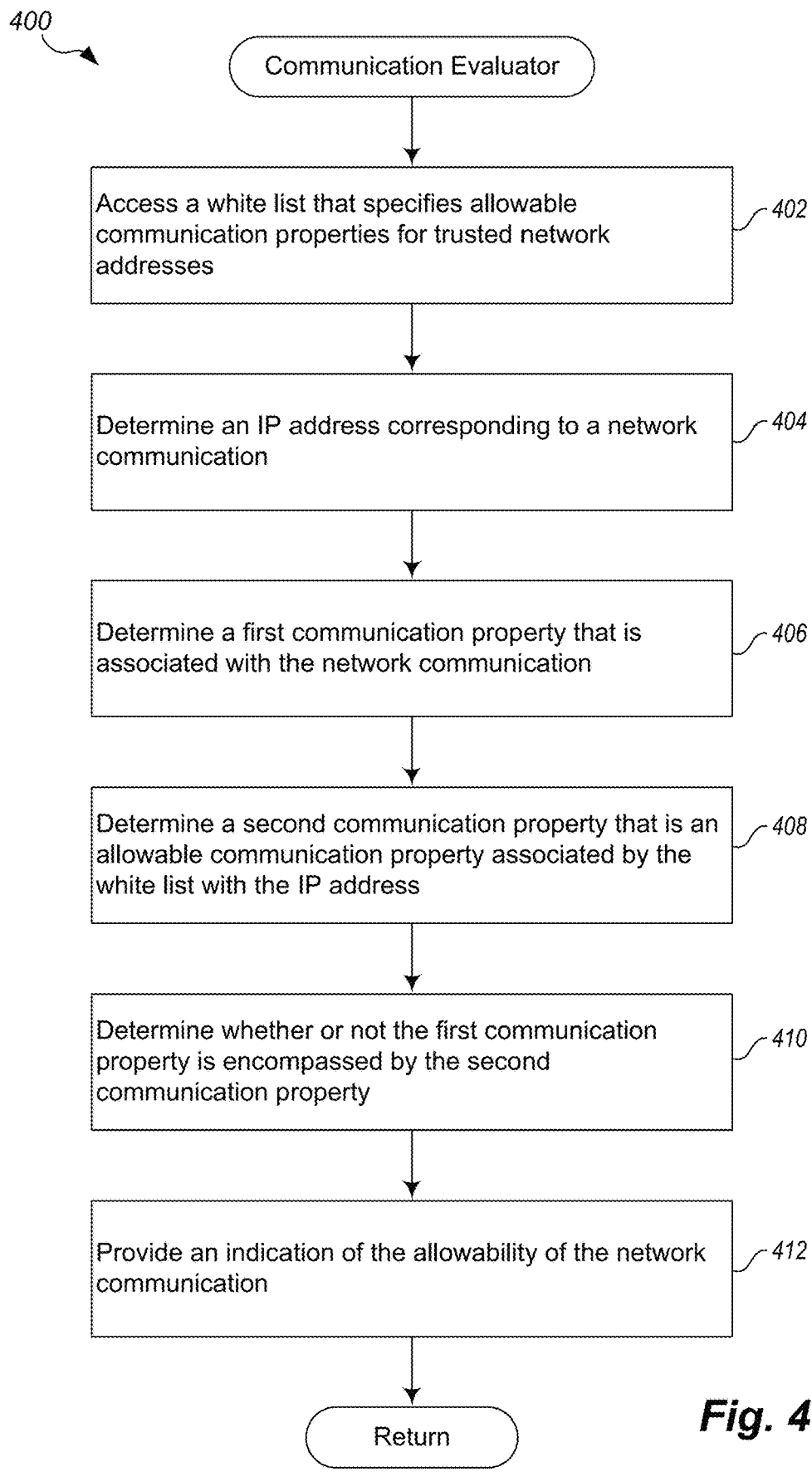
FIG. 4 is a flow diagram illustrating a first example network communication evaluator process.

FIG. 4 is a flow diagram illustrating a network communication evaluator process 400. The process 400 may be performed by a module such as the evaluation module 38 executed by the computing system 20 (FIG. 2).

The process begins at block 402, where it accesses a white list that specifies allowable communication properties for trusted network addresses. Accessing a white list may include receiving, querying, searching, or otherwise processing the white list. In some embodiments, the white list includes rows or entries that each include a trusted network address associated with indications of one or more allowable network communication properties, such as those described in Table 1, above. As discussed above, in some embodiments the addresses in the white list are obtained from an entity (e.g., IANA) in a secure and authenticated manner, so that the white list only contains trusted and authentic IP addresses.

At block 404, the process determines an IP address corresponding to a network communication. Determining the IP address may include requesting the IP address from the TCP/IP stack or other communication module in the computing system. The IP address may be the source or destination IP address of the communication. Typically, if the communication is an inbound connection, the source IP address (and possibly port) will be checked; if the communication is outbound, the destination IP address (and possibly port) will be checked. In other scenarios, the IP address may be determined in other ways, such as by querying a DNS server with a domain name associated with the network communication. The domain name may be determined, for example, with reference to a URL, email message, email address, or the like.

By relying on the TCP/IP stack, which obtains IP addresses directly from packet fields, the process is guaranteed to be using the actual IP addresses used in the communication. While it is possible to specify a false IP address in a packet, such a false address would cause the establishment of a TCP/IP session to fail, because it would not be possible to handshake with the source node (since a false IP address would cause the packet to be misrouted).

As discussed above, the IP address may be determined based on the payload of a network packet. Determining the IP address may include reading the IP address from a specific field in the payload of the packet, such as by reading the X-Forwarded-For field in the context of an HTTP request. In other cases, determining the IP address may include obtaining a hostname from the payload of the network packet, and then translating the hostname into an IP address. In the case of VPN protocols, the IP address may be obtained from a source IP address field of an encapsulated (and typically encrypted) network packet stored in the payload.

At block 406, the process determines a first communication property that is associated with the network communication. Determining the first communication property includes, for example, determining one of the properties described in Table 1. Note that in some embodiments, determining the first communication property reduces to determining an IP address and/or port associated with the communication. In such cases, no additional work need take place in this block, given that this information may have already been determined above. In other embodiments, additional properties beyond IP address/port may be determined. For example, the process may determine properties such as the time of day, the directionality of the communication, the type of data payload, or the like. The process may determine a geographic location associated with the network communication by, for example, querying a geo-location information service with the IP address against, and receiving in response an indication of a location (e.g., city, state, country, postal code) associated with the IP address.

At block 408, the process determines a second communication property that is an allowable communication property associated by the white list with the IP address. Determining the second property may include looking up the IP address in the white list and retrieving the communication property that is associated with the IP address and that corresponds to the first communication property. For example, if the first communication property is the time of day, the process may look up the allowable communication time periods in the white list. If the first communication property is a geographic location, the process may look up the allowable geographic locations in the white list. Note that the allowable communication property may be just an allowable IP address/port or address/port range. If the IP address in question exists in the white list, then it is allowable, otherwise not.

At block 410, the process determines whether or not the first communication property is encompassed by the second communication property. Determining whether the first property is encompassed by the second property may include determining whether the second property encloses or contains the first property. For example, if the second property is an allowable country (e.g., Washington state), the first property is encompassed by the country if the first property (e.g., Washington state, Seattle, a US postal code) is the same as or located within the allowable country. Similarly, if the second property is an allowable time period (e.g., between 6 AM and 11 PM), the first property is encompassed by the time period if the first property (e.g., 10 PM) is within the period.

In some embodiments, determining whether the first property is encompassed by the second property includes determining whether the two properties match. Matching properties may include performing an equivalence test, such as for equality between two strings, numbers, or other data types. In some cases, matching may be a strict equality test, whereas in other cases, an approximation may suffice, such as in case-insensitive string matching.

At block 412, the process provides an indication of the allowability of the network communication. Providing an indication of allowability may include notifying a user (e.g., via a dialog box or other popup window), sending a message (e.g., an email), recording an indication in a log, returning a value to another process or code block, or the like.

Some embodiments may provide additional or alternative functions. One embodiment performs user authentication, such as may occur in a Web context. Existing authentication schemes use a username/password combination. Some embodiments may also utilize one or more of the above-described techniques in conjunction with a username/password combination scheme. For example, some embodiments may check IP addresses in addition to usernames and passwords. As IP addresses are assigned and unique on the network, they cannot easily be faked by others. Thus, if a malicious user has stolen a user's username and password, he will not be able to break into the account as she/he will not have the correct IP address. Port numbers and other properties (e.g., time of day, geographic region) may also be included in the authentication scheme. Note that many if not all of these properties may be determined without interaction, intervention, or participation of the user. For example, an IP address may be determined directly with reference to the TCP/IP stack.

Also, current Internet service providers may use either Network Address Translation (NAT) or proxy services, so that many user may share the same IP address. Some embodiments function in a NAT/proxy context by using NAT/proxy services (e.g., provided by routers or gateways) that allocate static TCP port numbers corresponding to the internal IP addresses managed by the NAT/proxy module, so that each internal IP will have the same external IP address but have a unique and identifiable port number.

Figure 5:
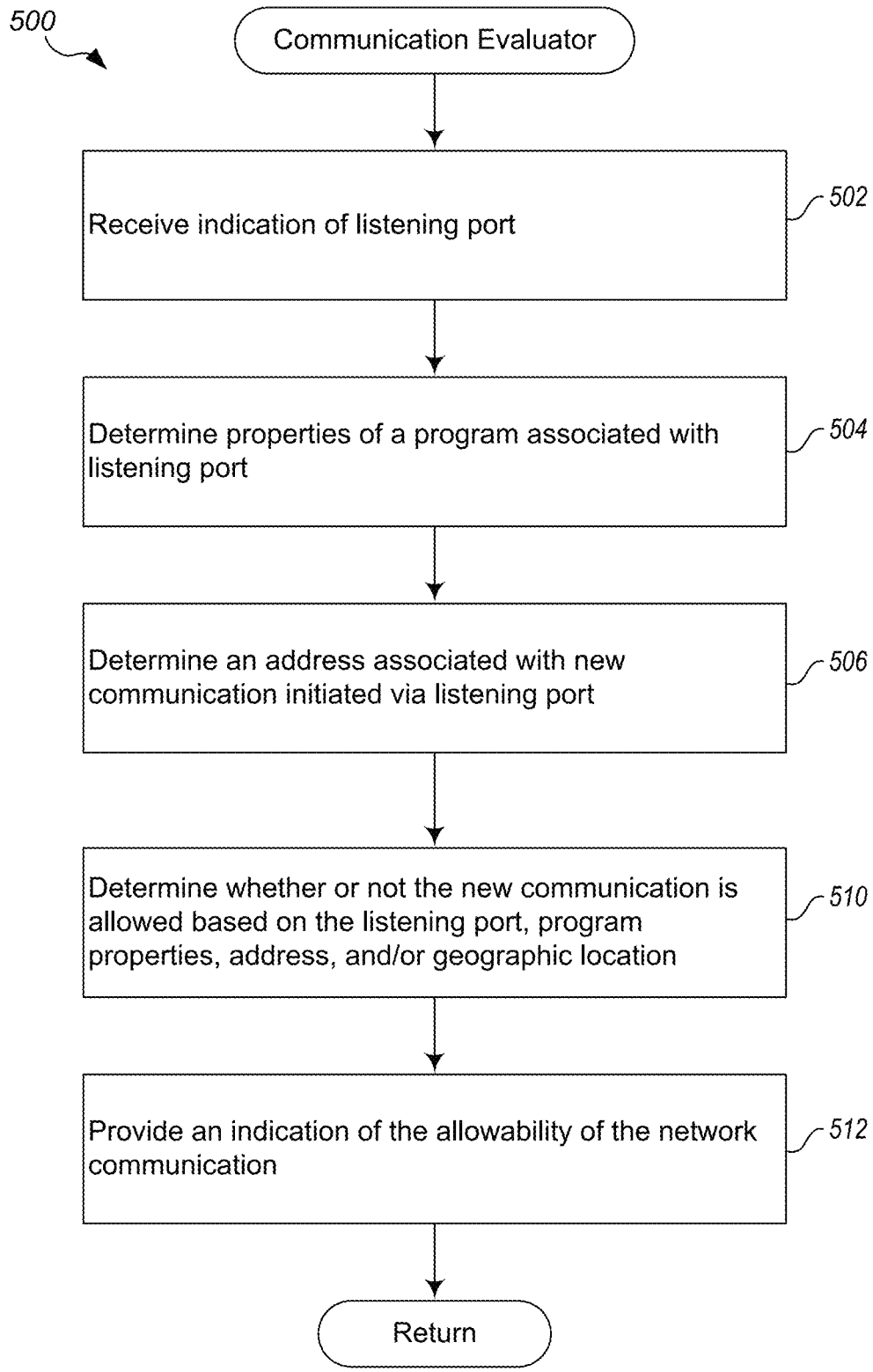
FIG. 5 is a flow diagram illustrating a second example network communication evaluator process.

FIG. 5 is a flow diagram illustrating a network communication evaluator process 500. The process 500 may be performed by a module such as the evaluation module 38 executed by the computing system 20 (FIG. 2).

The process begins at block 502, where it receives an indication of a listening port. A listening port is a port that is opened for purposes of receiving a new inbound communication. The listening port can be used to establish a new TCP/IP connection, to send/receive UDP messages/datagrams, or the like. The listening port may be opened based on the functioning of a legitimate server process (e.g., a Web server). Alternatively, the listening port may be opened up by a malicious program, such as Trojan or other malware that has infected a user's computer and opened a listening port for purposes of receiving instructions from a remote computer.

At block 504, the process determines properties of a program associated with the listening port. Determining properties of the program may include determining a program identifier, such as a program name, a process identifier, a hash of the program name, a hash of the program executable, or the like. Other properties may be determined instead or in addition, such as permissions, user/group information (e.g., owner of the program), program type, or the like. Program type may include whether the program is native (e.g., executable), a script, bytecode, or the like. Program type may also or instead include whether the program is interactive or non-interactive, as discussed above.

At block 506, the process, determines an address associated with new communication initiated via listening port. The address may be a network address and/or an associated port. The address may be the source or destination address. In some cases, the address may be provided by the networking module (e.g., TCP/IP stack) managed by the operating system of the local machine. In other cases, the address may be determined by inspecting the contents of a data packet or higher level networking protocol encapsulated within one or more layers of the communication. For example, the relevant address may be encapsulated within a VPN packet, contained within an HTTP header, or the like. As discussed above, the address may also be determined by translating domain names or other representations into a numeric network address.

In an optional operation, the process may determine a geographic location associated with the new communication. The process may determine a geographic location associated with the new communication by, for example, querying a geo-location information service with the IP address against, and receiving in response an indication of a location (e.g., city, state, country, postal code) associated with the IP address.

At block 510, the process determines whether or not the new communication is allowed based on the listening port, program properties, address, and/or geographic location. Typically, the program determines allowable communication properties from a white list or similar data structure that specifies allowable communication properties, such as connection limits associated with a listening port, which program (or type of program) may communicate, which address (or range of addresses) is allowed to be used for communication, and/or which geographic locations are allowed. The process then determines whether the properties of the actual communication are allowed (encompassed by) with respect to the allowable communication properties.

In some embodiments, block 510 optionally enforces a limit on the utilization of the listening port, such as by enforcing a maximum number of connections that can be opened via the listening port. The maximum number may represent a maximum number of current/active connections, a maximum number opened during some time window (e.g., 100 per hour), or the like. In other embodiments, the utilization may be limited based on how much bandwidth has been consumed via connections opened through the listening port, such as a maximum of 10 Mbits per second. Also, the utilization limit may be associated with a particular geographic region. For example, one embodiment may limit the number of active connections that may be open to IP addresses associated with a specified geographic region (e.g., city, country, continent).

In addition, limits may be established with respect to source IP addresses, so as to limit the number of connections that can be made from a single IP address or address range. The IP address can be fully or partially specified (e.g., via a range) or fully unspecified (e.g., "any" address). The above utilization limits can be employed to reduce the impact of denial of service attacks, by limiting inbound/outbound connections and/or bandwidth utilization.

At block 512, the process provides an indication of the allowability of the network communication. Providing an indication of allowability may include notifying a user (e.g., via a dialog box or other popup window), sending a message (e.g., an email), recording an indication in a log, returning a value to another process or code block, or the like.

In some embodiments, the process 500 evaluates whether the listening port is allowed to be opened, based on one or more properties of the opening program, time of day, port number, or the like. These properties can be specified in the white list or some other data structure. For example, the process 500 may determine whether the listening port can be used by one or more of: a particular program, a type of program (e.g., interactive, non-interactive), at a time of day (e.g., at night), a user identifier, or the like. If not, the process 500 may deny use of the listening port, transmit a warning or error message, log the unauthorized action, or the like. In some cases, the process 500 may allow the port to be opened, but only to accept connections according to particular properties (e.g., time of day).

In some embodiments, at least some of the above techniques can be applied to detect and limit denial of service attacks. In one embodiment, a process (e.g., process 500) monitors the communications (e.g., connections, messages, packets) being performed by the host system. The process 500 may then determine that a denial of service attack is progress based on one or more factors, including the total number of communications (e.g., connections opened), the total number of communications during a time interval (e.g., the last 5 minutes), the total number of communications to a same destination host, and the like. Note that this technique can be used to stop a host computing system from being employed (e.g., by a malicious party) to launch a denial of service attack against some other system. When a denial of service attack is detected, the process 500 may take various actions, such as refusing to allow additional communications (e.g., open additional connections, send additional packets) to the destination address.

Figure 6:
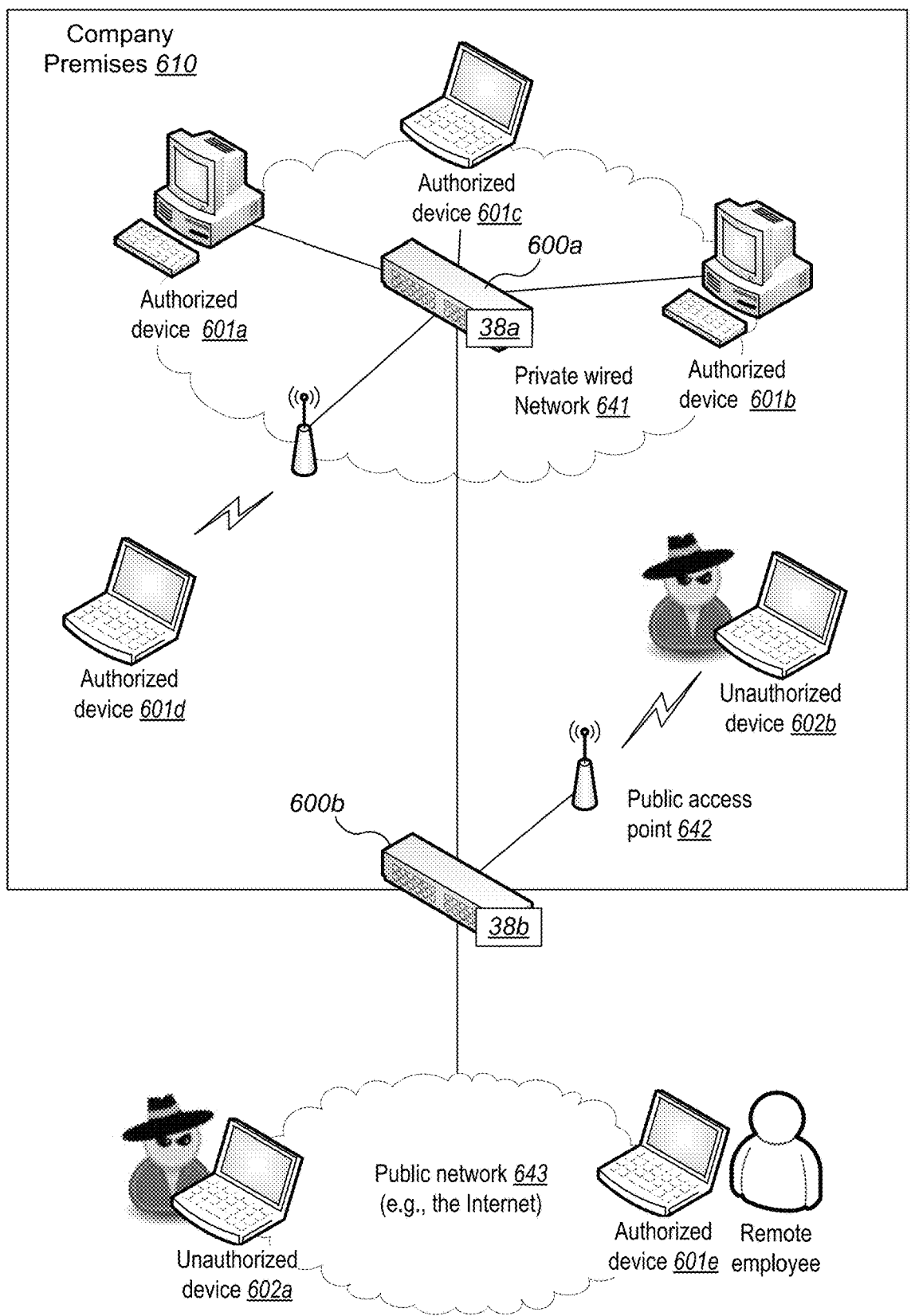
FIG. 6 is a block diagram illustrating network security based on device identifiers in an example network.

FIG. 6 is a block diagram illustrating network security based on device identifiers in an example network. Some embodiments enforce network security based on network addresses in combination with non-modifiable device identifiers, as discussed further below.

FIG. 6 illustrates network security processes in the context of an example company premises 610. The premises 610 includes a private wired network 641 that is connected to a number of authorized computing devices 601a-601d. A first networking device 600a (e.g., router or switch) facilitates communication within network 641 and between nodes of the network 641 and external network nodes. A second networking device 600b (e.g., a gateway or router) connects the network 641 to an external public network 642 (e.g., the Internet), and to a public access point 642 that provides guest network access within the premises 610.

In the illustrated embodiment, the networking devices 600 each execute an evaluation module 38 that is responsible for evaluating communications received from network nodes. Each evaluation module 38 allows or disallows a communication from a computing device based on various factors, including a source network address and/or a non-modifiable identifier of the computing device. In general, the evaluation module 38 will allow a communication if the source network address and the non-modifiable identifier are both authorized according to a white list or similar technique.

In one scenario, an unauthorized device 602a operated by a malicious user attempts to communicate with a node on the network 641. A network packet from device 602a is received by networking device 600b, where it is evaluated by module 38b. The network packet includes a source network address associated with device 602a. The module 38b will first determine whether the source network address is authorized according to a white list, as described above. If not, the packet is rejected and no communication is allowed. In this case, because module 38b does not have the network address of device 602a in its white list, module 38b drops the incoming packet. In some embodiments, the module 38b may redirect the communication to a mock system, as described further with respect to FIGS. 8 and 9, below.

Figure 8:
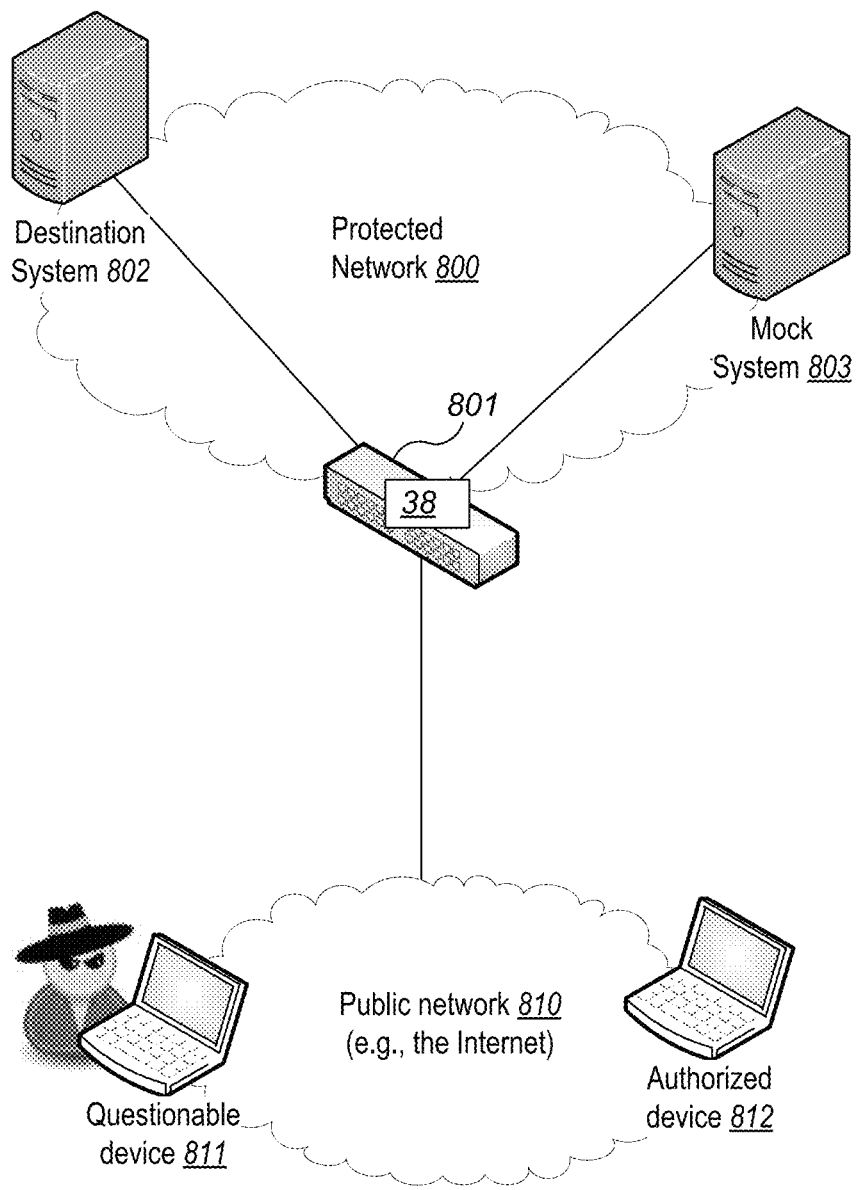
FIG. 8 is a block diagram illustrating the redirection of questionable network communication.
Figure 9:
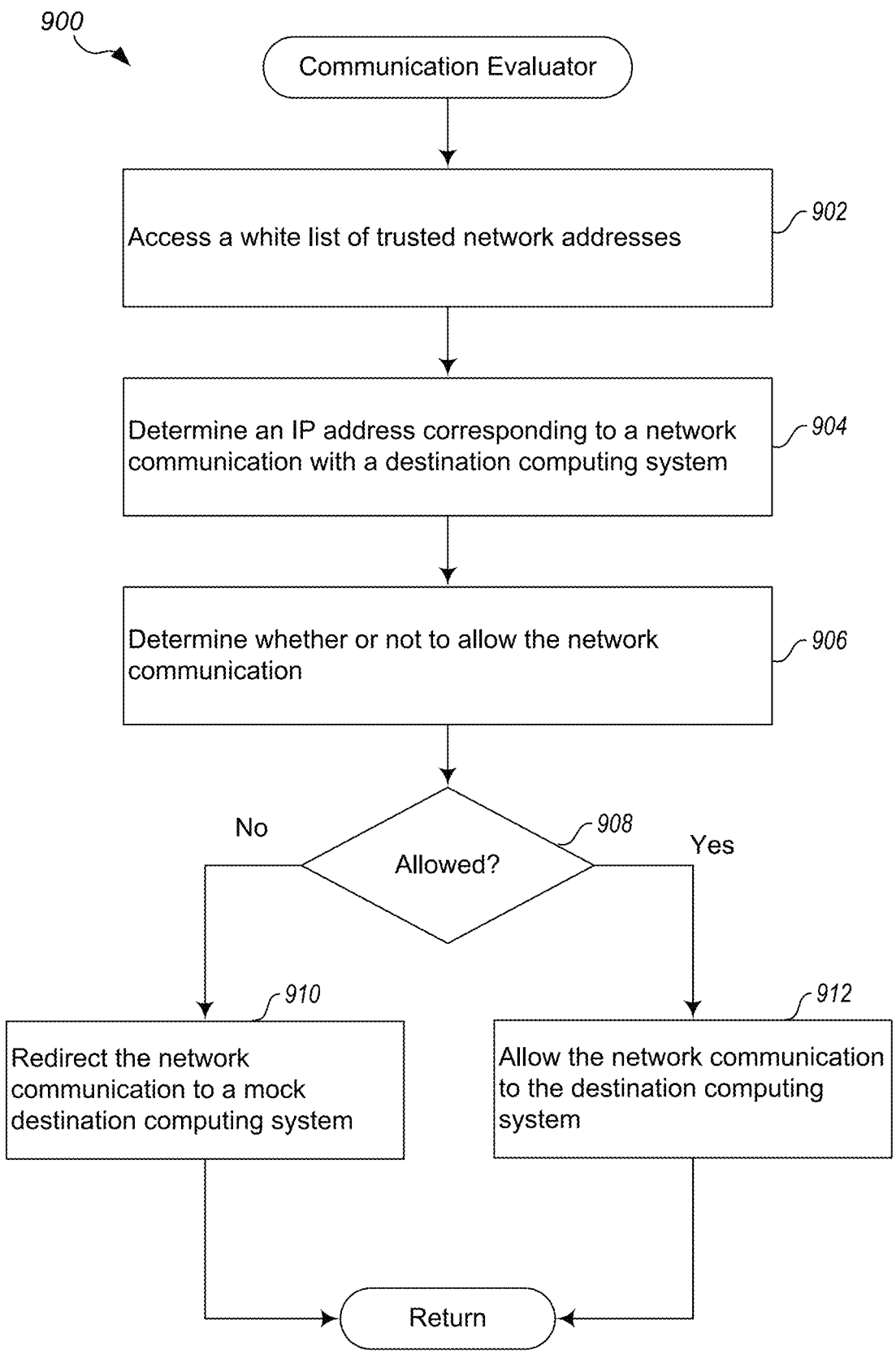
FIG. 9 is a flow diagram illustrating a fourth example network communication evaluator process.

To add an additional layer of security, the module 38b may also determine whether a non-modifiable identifier associated with the device 602*a* is authorized. The non-modifiable identifier is typically a hardware identifier, such as an identifier or serial number burned into a CPU, a motherboard, a disk, a video card, a network interface card, MAC address, or the like. The non-modifiable identifier may incorporate multiple hardware identifiers, such as by combining CPU and network card identifiers. If the non-modifiable identifier is not authorized, the packet is rejected and no communication is allowed. Again, some embodiments may instead redirect the communication to a mock system (FIGS. 8 and 9). Otherwise, as would typically be the case with authorized device 601*e* (operated by a remote employee), the source network address and non-modifiable identifier are both authorized, entitling device 601*e* to remote access to the network 641.

Note that checking the device identifier provides security in situations where a malicious user forges or uses an authorized network address. For example, suppose that the unauthorized device 602*a* communicates using an authorized IP address. Evaluation module 38*b* will still reject or redirect packets from device 602*a* so long as the device is unable to present an authorized device identifier.

In another scenario, an unauthorized device 602*b* operated by a malicious user is present within the company premises 610. The device 602*b* has connected to networking device 600*b* via a public wireless access point 642 that provides a guest network for visitors. When the device 602*b* transmits a network packet, it is received and analyzed by the module 38*b*. In this example, the source network address will typically be an authorized network address, as it has been assigned via a DHCP server or similar mechanism operated by the company. However, the unauthorized device 602*b* will not have an authorized non-modifiable identifier, and will therefore be refused access, at least to the private wired network 641. In some configurations, the device 602*b* will be allowed to communicate with external nodes, such as Websites or other servers on the public network 643.

In another scenario, suppose that the malicious user connected the unauthorized device 602*b* to the private wired network 641, such as by connecting a network cable to a jack in a conference room of the premises 610. In this case, a packet transmitted by the device 602*b* would be evaluated by module 38*a* of networking device 600*a*. Even if the packet includes an authorized source IP address, the packet will be rejected (or redirected) because the unauthorized device 602*b* is unable to present an authorized device identifier.

Special measures are taken to assure that non-modifiable identifiers cannot be manipulated or forged. In typical embodiments, all authorized devices are controlled by the company or other entity (e.g., government agency) that manages the network. Authorized devices are typically "locked down," meaning that ordinary users are not granted administrator rights, and therefore cannot perform operations such as modifying the boot sequence, installing or removing software, configuring network settings, running any unauthorized program/script, or the like. In some embodiments, a secure boot procedure is employed, thereby assuring that users cannot modify stored hardware identifiers, tamper with BIOS or other low-level code, boot non-authorized code, or the like. Device identifiers of authorized devices are added to a centralized white list, which is distributed to evaluation modules 38 using cryptographic measures (e.g., digital signatures) to ensure authenticity and data integrity.

Different schemes for communicating non-modifiable identifiers are contemplated. In one protocol, when the evaluation module receives and verifies a first packet from a given source address, the module transmits a message to the device at that source address. The message instructs the device to provide the non-modifiable identifier of the device in every subsequent communication (e.g., packet). Subsequent packets are checked for authorized source address and device identifiers.

In another protocol, when the evaluation module receives and verifies a first packet from a given source address, the module transmits a request to the device at that source address to also provide the non-modifiable identifier of the device. The device responds by transmitting the identifier, which can then be verified by the evaluation module. Once the identifier is verified, the evaluation module may allow a certain number (or time period) of packets from the given source address without renewing the request for the device identifier. For example, the evaluation module may require the device identifier every 100 packets, every minute, or on some other schedule (e.g., random windows). Such an approach minimizes the impact on network latency and throughput, since only a fraction of packets trigger the device identifier verification operation, which typically requires an additional network round trip to obtain the information from the remote device. The fraction of packets that are "audited" by the evaluation module is configurable, so that different levels of security are attainable. The frequency of device identifier verification may be configurable (e.g., check only first packet, check every packet, check every Nth packet, etc.) and/or specified with respect particular IP addresses or ranges, so that different levels of verification are performed with respect to different network sources.

In some embodiments, transmitted device identifiers are encrypted and/or digitally signed by the transmitting device. Encrypting the device identifier ensures that it is not possible for a malicious user to eavesdrop and thereby gain access to authorized device identifiers. Digitally signing the device identifier allows the evaluation module to verify that the device identifier was indeed provided by the authorized device and not some third party.

The above-described white list techniques are employed to verify source network addresses as well as non-modifiable device identifiers. In some embodiments, a single white list is used to store IP addresses (or ranges) and associated allowable network properties and device identifiers. In other cases, a first white list contains IP addresses (or ranges) while a second white list contains device identifiers. As discussed above, each address/identifier may have associated properties, such as those related to geographic location, dates, times, content types, and the like, in order to provide fine-grained control over the time, place, and manner of communication.

Figure 7:
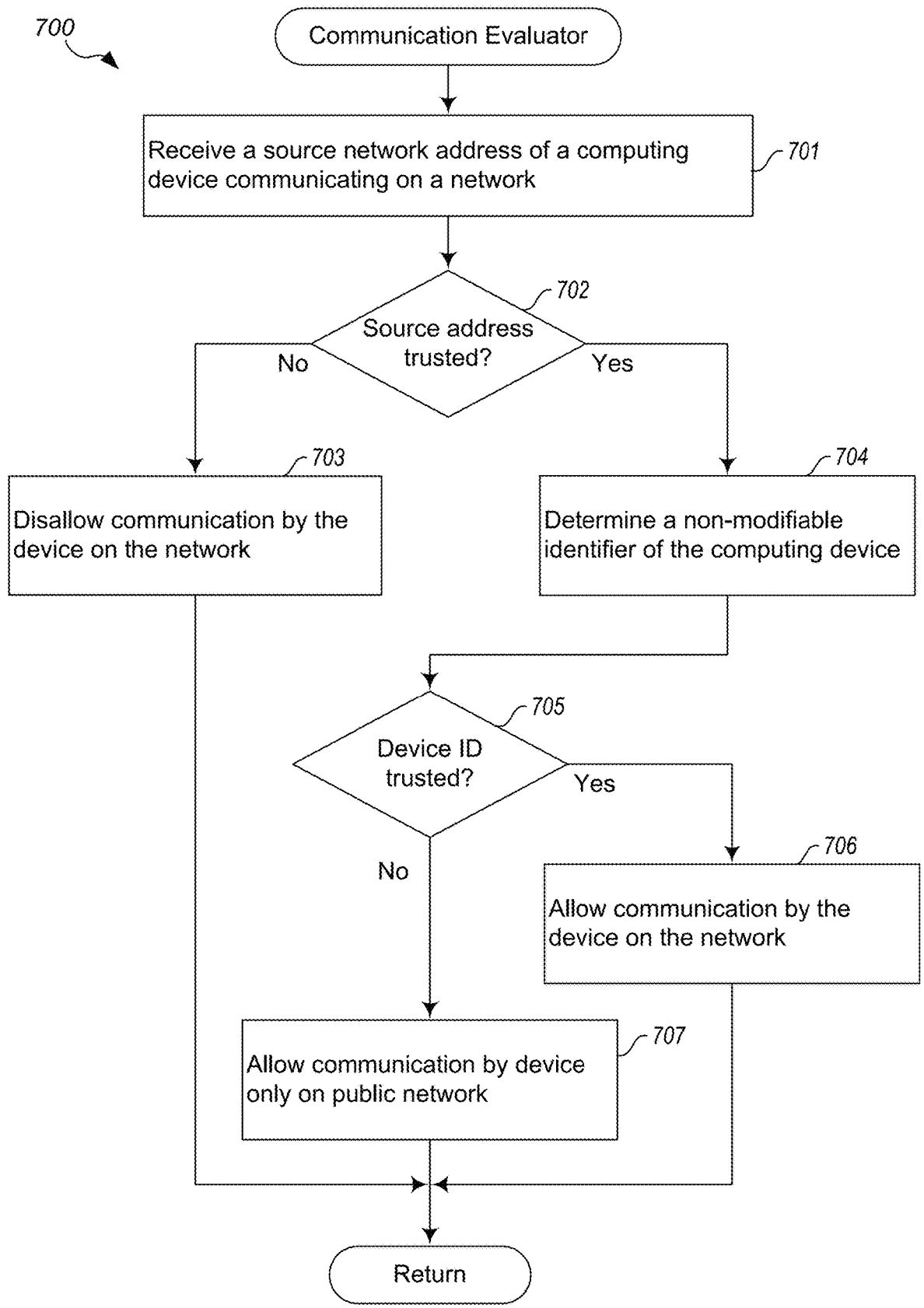
FIG. 7 is a flow diagram illustrating a third example network communication evaluator process.

FIG. 7 is a flow diagram illustrating a second example network communication evaluator process 700. The process 700 evaluates network communications based on network addresses and device identifiers. The process 700 is typically performed by an evaluation module resident on a networking device, such as the evaluation modules 38 described with respect to FIG. 6.

In block 701, the process receives a source network address of a computing device communicating on a network. The source address is typically obtained from a packet that is received by a networking device, such as a router or the like. The process may also obtain the destination port and/or other information from the packet. The network is typically managed by some organization or entity, such as a business, government agency, or the like.

In block 702, the process determines whether the source network address is a trusted network address. In some embodiments, this process executes process 600 (FIG. 4) or similar in order to determine whether the source network address is in a white list of trusted addresses. The process may also determine whether other properties of the network communication (e.g., port numbers, time of day, geographic location, etc.) are allowable in view of the requirements established by the white list, such as those described with respect to Table 1, above. If the source address is not a trusted address, the process proceeds to block 703, and otherwise to block 704.

At block 703, the process disallows communication by the device on the network. In some embodiments, disallowing communication includes disallowing communication even on a public portion of a network. Other embodiments will allow limited communication, such as by inspecting the destination address of the packet. Other embodiments may redirect the communication to a mock system, as in FIGS. 8 and 9. If the destination address is outside of the managed network, then the packet may be allowed to proceed.

At block 704, the process determines a non-modifiable identifier of the computing device. As described above, the non-modifiable identifier may include an identifier of one or more of a CPU, a network interface card, a storage device, an input output device, or the like. This identifier may be determined in various ways. In some embodiments, the process requests the identifier from the remote computing device. As noted above, this request need not be made for every packet processed. In some embodiments, the process requests a device identifier in response to the first packet received, and then every N-th packet thereafter. In other embodiments, the process may randomly audit packets.

At block 705, the process determines whether the non-modifiable device identifier is a trusted identifier. The process performs this function by looking at a white list or similar data structure that stores authorized device identifiers. If the non-modifiable device identifier is a trusted identifier, the process proceeds to block 706, and otherwise to block 707. Note that the device white list may also specify allowable communication properties associated with each device identifier, such as the properties discussed with respect to Table 1, above. For example, geographic or time limitations can be imposed on certain device identifiers.

At block 706, the process allows communication by the device on the network. Allowing the communication typically entails forwarding the packet to its destination on the private network.

At block 707, the process allows communication by the device only on a public network. Allowing communication by the device only on a public network means that, if the device is on a private portion of the network, communication by the device is disallowed. With respect to FIG. 6, the unauthorized device 602b may still communicate even though it does not have an authorized device identifier. However, such communication is typically limited to "outbound" communications, that is, communications with hosts that are outside of the company premises 610. Restricting such communication only to the public portion of the network may additionally require that the process examine the destination address, and thereby determine if the communication is directed to hosts that are inside or outside of the managed network.

FIG. 8 is a block diagram illustrating the redirection of questionable network communication. Some embodiments enforce network security by redirecting questionable network accesses to a mock computing system, as discussed further below.

FIG. 8 shows a protected network 800 that includes a networking device 801 (e.g., router, firewall, switch, server), a destination computing system 802 and a mock computing system 803. The networking device 801 interfaces the protected network 800 with a second network, in this example a public network 810 such as the Internet. The public network 810 includes a questionable computing device 811 and an authorized computing device 812.

In the illustrated embodiment, the networking device 800 executes an evaluation module 38 that is responsible for evaluating communications received from network nodes. The evaluation module 38 allows, disallows, redirects, or otherwise processes a communication from a computing device based on properties of the communication (e.g., source IP address, location, time of day) and allowable communication properties such as those specified in Table 1, above.

In an example of an allowed communication, the authorized device 812 attempts to communicate with the destination system 802 on network 800. A network packet from device 812 is received by networking device 801, where it is evaluated by the module 38. The network packet includes a source network address associated with device 812. The module 38 will look up any allowable communication properties associated with the source network address. Based on the allowable communication properties and properties of the communication, the module 38 will allow or disallow the communication. In this case, the communication from the source device 812 is allowed, because one or more of the following are true: the device 812 is using an authorized IP address, is communicating from an allowable geographic region, is communicating during an allowable time of day, or the like. Upon determining that the communication is allowed, the networking device 801 forwards the communication (e.g., transmits the packet) to the destination system 802.

In an example of a disallowed communication, the questionable device 811 operated by a malicious user attempts to communicate with the destination system 802 on network 800. A network packet from device 811 is received by networking device 801, where it is evaluated by the module 38. The module 38 will look up any allowable communication properties associated with a source address obtained from the network packet. Based on the allowable communication properties and properties of the communication, the module 38 will allow or disallow the communication. In this case, the communication from the questionable device 811 is disallowed, because one or more of the following are true: the device 811 is not using an IP address that is included in the white list, is not communicating from an approved geographic location, or the like. In this embodiment, upon determining that the communication is not allowed, the networking device 801 redirects the communication (e.g., transmits the packet, generates an HTTP redirect, etc.) to the mock computing system 803, rather than the destination system 802.

Network communication can be redirected in various ways. In some embodiments, a packet can be redirected by transmitting the packet to a different host/network. In such cases, the destination address of the packet may need to be modified. In other embodiments, an application-level redirect can be employed, such as an HTTP redirect. For example, the evaluator 38 may be utilized by a Web server. In this context, a questionable communication may be one that comes from a disallowed source IP address (e.g., obtained from the TCP/IP stack). Instead of serving a requested page to the device 811, the Web server responds with an HTTP redirect (e.g., response code 301) that causes the questionable device 811 to interact with the mock system 803 instead.

The mock computing system 803 is a computing system that masquerades, simulates, and/or mimics at least some of the behavior, structure, and function of the destination computing system 802. The mock system 803 may provide substantially or totally the same functions as the destination system 802, but instead store or provide false or fake data, such as personal information (e.g., credit card information, social security number), company data (e.g., company trade secrets, financial data, classified data), national security data, or the like. The provided data may be designed to mislead, fool, confuse, or track the malicious user. As noted above, some of the fake data may be specially configured to track its use at a later time. For example, personal information may include intentional misspellings that can be identified at a later time. As another example, digital image, audio, or video content may include watermarks or other signals that are not perceptible to humans, but that can uniquely identify the content as having been obtained from the mock system 803 without authorization.

The mock computing system 803 is typically configured to track the network communication from the questionable device 811. Tracking the communication can include logging, recording, or otherwise monitoring the actions of the questionable device 811.

In some cases, the mock computing system 803 will attempt to initiate a "counter-attack" against the questionable device 811. For example, the mock system 803 may attempt to use the network communication to penetrate the security of the questionable device (e.g., by causing a buffer overflow, script injection, or the like) in order to install program code (e.g., a rootkit, Trojan, worm) that can be used to monitor or control the operation of the questionable device 811.

In some embodiments, the mock system 803 will be a virtual machine. Some embodiment utilize a collection of virtual machines to serve as mock systems. These virtual machines can be allocated based on various factors, such as the source IP address of the communication, so that a given attacker will always be directed to a given virtual machine, even upon a later access. Also, the use of virtual machines allows different attackers to be redirected to different mock computing systems.

FIG. 9 is a flow diagram illustrating a fourth example network communication evaluator process 900. The process 900 evaluates and redirects network communications based on allowable communication properties from a white list. The process 900 is typically performed by an evaluation module resident on a networking device, such as the evaluation modules 38 described with respect to FIG. 8.

The process beings at block 902, it where it accesses a white list that specifies allowable communication properties for trusted network addresses. Accessing a white list may include receiving, querying, searching, or otherwise processing the white list. In some embodiments, the white list includes rows or entries that each include a trusted network address associated with indications of one or more allowable network communication properties, such as those described in Table 1, above.

In block 904, the process determines an IP address corresponding to a network communication with a destination computing system. Determining the IP address may include requesting the IP address from the TCP/IP stack, via packet inspection, or other communication module in the computing system. The IP address may be the source or destination IP address in a network packet. The IP address may also or instead be encapsulated within the payload section of a network packet, as discussed above. Typically, if the communication is an inbound connection as in FIG. 8, at least the source IP address and port will be checked. Note that some embodiments will check both the source and destination IP addresses.

In block 906, the process determines whether or not to allow the network communication. Determining whether or not to allow the communication may include determining whether properties of the network communication (e.g., one or more of source IP address, destination port number, time of day, geographic location) are encompassed by corresponding allowable communication properties obtained from the white list (e.g., a property specifying an allowable IP address/port, an allowable time of day associated with an IP address, or the like). In some cases, at least some of blocks 902-906 may be performed by invoking process 400 of FIG. 4, or similar.

In block 908, the process proceeds to block 910 when the communication is not allowed, and proceeds to block 912 when the communication is allowed.

In block 910, the process redirects the network communication to a mock destination computing system. The process here may modify destination addresses stored in packets so that the destination addresses reference the mock system instead of the original destination system. Then the packets are transmitted and carried via the network to the mock system. Other or additional techniques for redirection are discussed with respect to FIG. 8.

As noted, outbound communication may also or instead be evaluated. The outbound communication may be redirected to a mock computing system that records the received communication. For example if malicious software is executing within an entity's network (e.g., a corporation's network, a university's network), the software may at some point make an outbound connection to a questionable network destination. Using the described techniques, the communication may be redirected to a mock system operated by the entity. The mock system records the interaction with the malicious software, so that its behavior and/or transmitted data may be studied. In some cases, the mock system acts as a transparent conduit or "wiretap", such as by recording the communication but then also forwarding it to its real destination, so that from the point of view of the malicious software, it is still communicating with the intended destination system.

In some embodiments, a questionable outbound communication can in some circumstances be redirected to a mock system operated by a different entity. For example, some embodiments can tag an outbound packet as being questionable (e.g., based on its source address), so that the destination system/network can subject the patent to higher scrutiny, redirection to a mock system, or the like. Instead of tagging or otherwise modifying a questionable packet, some embodiments communicate a concern regarding the questionable packet to the remote system/network by transmitting in advance of the questionable packet a warning packet that identifies the properties (e.g., IP addresses, ports, etc.) of the questionable communication. Upon receipt of the warning packet, the remote network/system can subject packets associated with the questionable communication to heightened scrutiny, redirection, or the like.

In block 912, the process allows the network communication to the destination computing system. Allowing the communication may include forwarding (e.g., transmitting) a packet onwards to the destination system or to another machine (e.g., router) that is configured to reach the destination system.

The above specification, examples, and data provide a complete description of the manufacture and use of the composition of the invention. However other embodiments will be clear to one skilled in the art. Since many embodiments of the invention can be made without departing from the spirit and scope of the invention, the invention is defined by the claims hereinafter appended.

The invention claimed is:

1. A computing system for controlling network communication, comprising:
 a processor; and
 a memory that stores a module that is configured to evaluate a network communication that comes from a source computing system and that is directed to a destination computing system, by:
  receiving a predefined white list of trusted network addresses;
  determining a first internet protocol (IP) address corresponding to the network communication;
  determining a destination port corresponding to the network communication;
  determining whether or not to allow the network communication based at least in part on whether the first IP address and the destination port are allowable according to the white list;
  in response to determining not to allow the network communication, redirecting the network communication to a mock destination computing system that is not the same as the destination computing system; and
  wherein the mock destination computing system is configured to track the network communication and to record that the network communication is associated with an attempt to gain unauthorized access to the destination computing system.

2. The computing system of claim 1, wherein the destination computing system and the mock destination computing system each provide the same services, and wherein the destination computing system includes private data that is not present on the mock destination computing system.

3. The computing system of claim 1, wherein redirecting the network communication to the mock destination computing system includes transmitting a network packet associated with the network communication to the mock destination computing system.

4. The computing system of claim 1, wherein redirecting the network communication to the mock destination computing system includes modifying a destination network address of a network packet, wherein the modified destination network address identifies the mock destination computing system.

5. The computing system of claim 1, wherein redirecting the network communication to the mock destination computing system includes transmitting an HTTP redirect to the source computing system, the HTTP redirect identifying the mock destination computing system.

6. The computing system of claim 1, wherein the module is further configured to:
 receive a network packet transmitted by the source computing system; and
 determine the first IP address by reading a source address field of the network packet.

7. The computing system of claim 1, wherein the network communication is an inbound TCP/IP connection request, and wherein first IP address is not a false address and is an actual network address of the source computing system.

8. The computing system of claim 7, wherein the module is further configured to:
 determine a second IP address corresponding to the communication, wherein the second IP address is not a false address and is an actual network address of the destination computing system; and
 determine whether both the first and second IP address are allowable according to the white list.

9. The computing system of claim 1, wherein the network communication is an outbound TCP/IP connection request, and wherein first IP address is not a false address and is an actual network address of the destination computing system.

10. The computing system of claim 1, wherein determining a first IP address includes receiving the IP address from a TCP/IP stack of the computing system.

11. The computing system of claim 1, wherein the white list includes, for each trusted network address, one or more indications of allowable communication properties, and wherein determining whether or not to allow the network communication includes:
 determining a first communication property that is associated with the network communication;
 determining a second communication property that is an allowable communication property specified by an entry in the white list that corresponds to the first IP address; and
 determining whether or not the first communication property is encompassed by the second communication property.

12. The computing system of claim 11, wherein the allowable communication properties in the white list include, for each network address in the white list, an indication of an allowable geographic location, and wherein determining whether or not to allow the network communication includes:
 determining, by querying a geo-location information provider, a geographic location associated with the first IP address; and
 determining whether the geographic location associated with the first IP address matches or is encompassed by the geographic location indicated as allowable by the entry in the white list.

13. The computing system of claim 1, wherein the module is further configured to:
 receive Internet Protocol addresses that are authenticated by an entity that allocates Internet Protocol addresses.

14. The computing system of claim 1, wherein determining whether or not to allow the network communication includes:
 determining whether or not to allow the network communication based properties associated with a listening port that is open on the computing system, wherein the properties include the first IP address and one or more of:
  a property of a program that is using the listening port, including the identity of the program and/or whether the program is an interactive program, a batch program, or a system service;
  a geographic location associated with the first IP address;

a connection limit based on the first IP address or the geographic location, the first IP address being a source or destination IP address;

a time of day; and a network interface that is associated with the network communication.

15. The computing system of claim 1, wherein determining whether or not to allow the network communication includes:

receiving data representing a non-modifiable device identifier of the source computing system;

determining whether the device identifier is included in a list of trusted device identifiers; and when the device identifier is included in the list of trusted device identifiers, allowing the network communication.

16. The computing system of claim 1, wherein the source computing system operates on a first network and the destination computing system operates on a second network, and wherein the first and second networks are operated by different entities.

17. A method for controlling network communication, the method comprising:

evaluating a network communication that comes from a source computing system and that is directed to a destination computing system, by:

receiving a predefined white list of trusted network addresses;

determining a first internet protocol (IP) address corresponding to the network communication;

determining a destination port corresponding to the network communication;

determining whether or not to allow the network communication based at least in part on whether the first IP address and the destination port are allowable according to the white list;

in response to determining not to allow the network communication, redirecting the network communication to a mock destination computing system that is not the same as the destination computing system; and wherein the mock destination computing system is configured to track the network communication and to record that the network communication is associated with an attempt to gain unauthorized access to the destination computing system.

18. A non-transitory computer-readable medium storing contents that are configured, when executed by a computing system, to perform a method comprising:

evaluating a network communication that comes from a source computing system and that is directed to a destination computing system, by:

receiving a predefined white list of trusted network addresses; determining a first internet protocol (IP) address corresponding to the network communication;

determining a destination port corresponding to the network communication;

determining whether or not to allow the network communication based at least in part on whether the first IP address and the destination port are allowable according to the white list;

in response to determining not to allow the network communication, redirecting the network communication to a mock destination computing system that is not the same as the destination computing system; and wherein the mock destination computing system is configured to track the network communication and to record that the network communication is associated with an attempt to gain unauthorized access to the destination computing system.

* * * * *